(12) United States Patent
Stanton

(10) Patent No.: US 9,053,517 B2
(45) Date of Patent: Jun. 9, 2015

(54) DEVICES, SYSTEMS, AND METHODS FOR AGGREGATING, CONTROLLING, ENHANCING, ARCHIVING, AND ANALYZING SOCIAL MEDIA FOR EVENTS

(75) Inventor: Lawrence S. Stanton, Dallas, TX (US)

(73) Assignee: rb.tv., Inc., Dallas, TX (US)

(*) Notice: Subject to any disclaimer, the term of this patent is extended or adjusted under 35 U.S.C. 154(b) by 340 days.

(21) Appl. No.: 13/560,238

(22) Filed: Jul. 27, 2012

(65) Prior Publication Data

US 2013/0046826 A1 Feb. 21, 2013

Related U.S. Application Data

(60) Provisional application No. 61/513,435, filed on Jul. 29, 2011.

(51) Int. Cl.
| | |
|---|---|
| G06F 15/16 | (2006.01) |
| G06Q 50/00 | (2012.01) |
| G06Q 10/10 | (2012.01) |
| G06Q 30/02 | (2012.01) |
| G06F 17/30 | (2006.01) |

(52) U.S. Cl.
CPC ............ *G06Q 50/01* (2013.01); *G06Q 10/10* (2013.01); *G06Q 30/02* (2013.01); *G06F 17/30699* (2013.01); *G06F 17/30867* (2013.01)

(58) Field of Classification Search
None
See application file for complete search history.

(56) References Cited

U.S. PATENT DOCUMENTS

| | | | |
|---|---|---|---|
| 8,516,374 B2 * | 8/2013 | Fleischman et al. ........... 715/716 |
| 8,543,454 B2 * | 9/2013 | Fleischman et al. ........ 705/14.44 |
| 8,688,673 B2 * | 4/2014 | Sarkar ........................... 707/706 |
| 2008/0147487 A1 * | 6/2008 | Hirshberg ........................ 705/10 |
| 2011/0040760 A1 * | 2/2011 | Fleischman et al. ........... 707/737 |
| 2011/0041080 A1 * | 2/2011 | Fleischman et al. ........... 715/751 |
| 2011/0154223 A1 * | 6/2011 | Whitnah et al. ................ 715/753 |
| 2012/0042020 A1 * | 2/2012 | Kolari et al. ................... 709/206 |
| 2012/0192227 A1 * | 7/2012 | Fleischman et al. ............. 725/34 |
| 2012/0215903 A1 * | 8/2012 | Fleischman et al. ........... 709/224 |
| 2013/0014031 A1 * | 1/2013 | Whitnah et al. ................ 715/753 |
| 2013/0086489 A1 * | 4/2013 | Fleischman et al. ........... 715/753 |
| 2013/0198655 A1 * | 8/2013 | Whitnah et al. ................ 715/753 |
| 2013/0346330 A1 * | 12/2013 | Fleischman et al. ........... 705/319 |

* cited by examiner

*Primary Examiner* — Ranodhi Serrao
(74) *Attorney, Agent, or Firm* — Haynes and Boone, LLP

(57) ABSTRACT

Devices, systems, and methods for controlling, enhancing, archiving, and analyzing social media related to an event are disclosed. In some instances, the method includes: aggregating, using a computing device, posts made to at least one social media platform by a plurality of posters to identify a plurality of posts related to an event; filtering the identified plurality of posts related to the event to identify a plurality of relevant posts; and broadcasting the plurality of relevant posts for display on at least one display.

20 Claims, 32 Drawing Sheets

Fig. 5

Ad/Promo/Info Scheduling Options

Status    ○ Active   ● Inactive

Schedule Type   Time

Frequency   5
Minutes before this insertion repeats.

Inactivity Length   30
Minutes of no new tweets that triggers this insertion.

Width   140
Width in pixels for this insertion.

Start Date   2011-07-21
Start date.

Start Time   09:00:00
Start time.

End Date   2011-07-08
End date.

End Time   09:00:00
End time.

Fig. 16

Ad/Promo/Info Scheduling Options

Status  ○ Active  ● Inactive

Schedule Type  [ Inactivity ▼ ]

Frequency  15
Minutes before this insertion repeats.

Inactivity
Length  30
Minutes of no new tweets that triggers this insertion.

Width  140
Width in pixels for this insertion.

Start Date  Start date.

Start Time  Start time.

End Date  End date.

End Time  End time.

Fig. 17

Banner Scheduling Options

| | | |
|---|---|---|
| Status | ○ Active  ● Inactive | |
| Frequency | 60 | Minutes before this banner repeats. |
| Width | 140 | Width in pixels for this banner. |
| Start Date | 2011-07-08 | Start date. |
| Start Time | 14:00:00 | Start time. |
| End Date | 2011-07-11 | End date. |
| End Time | 08:00:00 | End time. |
| Last Ran | 0 | The last time this banner ran. |

Fig. 19

RePost & Syndication

RePost Username    hpbnc
                   Twitter acount to use for retweets.

RePost Password    byron09
                   Password for the retweet twitter acount.

2011 amazing artists Banks best Brown Chris chrisbrown ComplexMag cont crazy crowd DAT Dipset DJKidRelly drakkardnoir DuckDownMusic fans Flocka great guests HOT97 hot97summerjam impressionable jam killed Lil LilTunechi LilTwist Lloyd Lloydbanks lmao lol looking love mid-week MISSED movie myfabolouslife NIGGA online performance Price recaps Reebok Rick rickyrozay Ross Sean SeanMandela shit smh snapbacks stadium staff stage stream Summer SWAG Thank THEJUELZSANTANA think Thoughts tonight waka watch Wayne wit wore WRAP YALL yesterday YMCB YMCMB youth

Fig. 32

DEVICES, SYSTEMS, AND METHODS FOR AGGREGATING, CONTROLLING, ENHANCING, ARCHIVING, AND ANALYZING SOCIAL MEDIA FOR EVENTS

CROSS-REFERENCE TO RELATED APPLICATIONS

The present application claims priority to and the benefit of U.S. Provisional Patent Application No. 61/513,435, filed Jul. 29, 2011, which is hereby incorporated by reference in its entirety.

BACKGROUND

The event, entertainment, broadcast, corporate hospitality, trade show, convention, and advertising worlds have been given a mandate to engage and activate social media in an effort to extend their audiences, increase the engagement and participation, and glean valuable information from attendees, customers, fans, participants, guests, and the public in general. This includes audience members onsite or in person as well as those audience members that are participating in the event remotely. However, with the desire to open up events to social media comes a substantial concern about not being able to manage or control what is shared or broadcast. Accordingly, there remains a need for improved devices, systems, and methods for aggregating, controlling, enhancing, archiving, and analyzing social media.

SUMMARY

Embodiments of the present disclosure are configured to manage the concerns surrounding the incorporation of social media into the event, entertainment, broadcast, corporate hospitality, trade show, convention, and advertising worlds, cause/increase engagement, enhance the user experience through the addition of social media, and measure and analyze the opinions and experiences attendees are having. In that regard, the present disclosure provides devices, systems, and methods for aggregating, managing, engaging, enhancing, archiving, and analyzing the incorporation of social media into events. Additional aspects, features, and advantages of the present disclosure will become apparent from the following detailed description.

BRIEF DESCRIPTION OF THE DRAWINGS

Illustrative embodiments of the present disclosure will be described with reference to the accompanying drawings, of which:

FIG. 5 is a screen shot illustrating a list of users according to an exemplary embodiment of the present disclosure.

FIG. 16 is a screen shot illustrating control options related to the insertion of information into the stream according to another embodiment of the present disclosure, where particular control options have been highlighted.

FIG. 17 is the screen shot of FIG. 16, but with alternative control options highlighted.

FIG. 19 is a screen shot illustrating control options related to a banner according to another embodiment of the present disclosure.

FIG. 25 is a screen shot illustrating a repost setup according to another embodiment of the present disclosure.

FIG. 28 is a screen shot of a portion of a stream according to an exemplary embodiment of the present disclosure.

FIG. 32 is a graphical representation of an analysis of data related to social media management in conjunction with an event according to another embodiment of the present disclosure.

DETAILED DESCRIPTION

Figure 1:
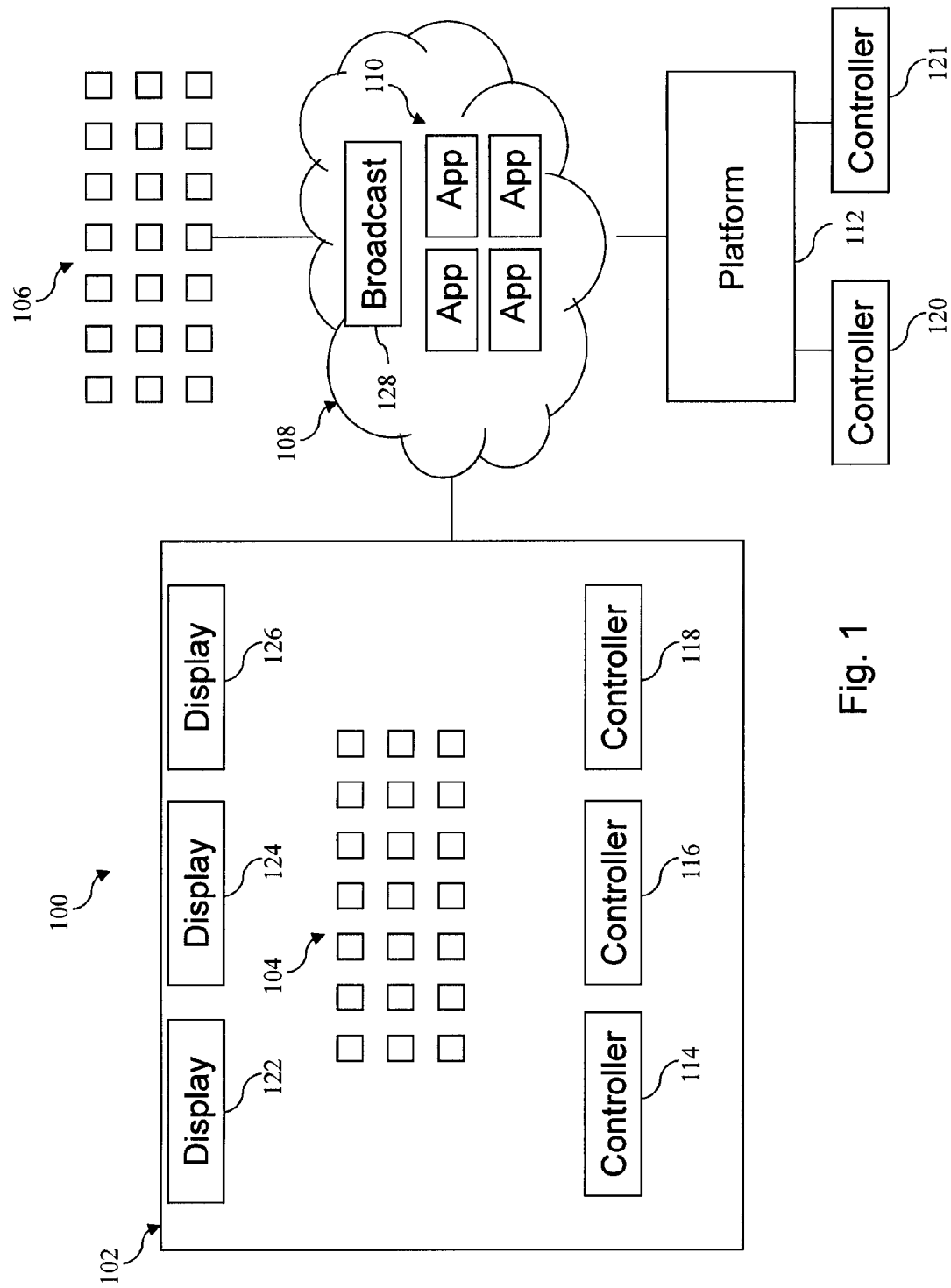
FIG. 1 is a diagrammatic schematic view of an arrangement according to one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of the disclosure is intended. Any alterations and further modifications to the described devices, systems, and methods, and any further application of the principles of the present disclosure are fully contemplated as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. However, for the sake of brevity the numerous iterations of these combinations will not be described individually.

Referring to FIG. 1, shown therein is an arrangement 100 that illustrates various aspects and features of the present disclosure. An event 102 is shown having a local audience 104 and a remote audience 106. Unless otherwise clarified, the term "event" as used in conjunction with the present disclosure is understood to encompass a broad range of activities, including without limitation conferences, tradeshows, meetings, concerts, sporting events, plays, musicals, movies, television shows, political campaigns, event series (e.g., an event with multiple parts or components happening at different times and/or places), and/or any other happenings where a plurality of people will be in attendance. As shown, the event 102 (including the local audience 104) is connected to a network 108. In that regard, the connection to the network 108 may be through one or more wired connections (e.g., Ethernet), wireless connections (e.g., Wi-Fi, cellular data network(s), Bluetooth, etc.), and/or combinations thereof. It is understood that, in some instances, there are multiple connections to the network from the event 102. For example, individual devices at the event may each have a separate connection to the network 108. In other instances, a single connection extends between the event 102 and the network 108. In some such instances, individual devices at the event 102 are in communication with a controller (e.g., server, router, and/or switch) that controls the single connection between the event and the network 108. In some instances, the connection(s) between the event 102 and the network 108 are secure (e.g., encrypted, password protected, and/or otherwise secured). In that regard, in some instances the network 108 is a private or local area network. In other instances, the network 108 is a wide area network, such as the Internet. As also shown, the members of the remote audience 106 are also connected to the network 108. The connections of the members of the remote audience 106 to the network can be wired, wireless, and/or combinations thereof. Further, the connections of the members of the remote audience 106 to the network are secure connections in some instances.

Further, in some instances the event is maintained private such that the data being displayed/broadcast for the event is not shared across public spaces and is accessible only by authorized users/attendees. Further still, where confidential information is to be shared at an event, the unauthorized sharing or posting of the confidential information can be tracked using the features of the present disclosure discussed below for identifying posts relevant to an event (e.g., based on keyword(s) associated with the confidential information). In that regard, a user who shares or posts the confidential information can be identified and contacted immediately to request removal of the confidential information.

As shown in FIG. 1, a plurality of social media applications 110 are running within the network 108. Via the connections to the network 108, members of both the local audience 104 and the remote audience 106 have access to the plurality of social media applications 110. The social media applications 110 are understood to encompass a wide variety of social media platforms, including without limitation micro-blogs (e.g., Twitter, Jaiku, Plurk, Tumblr, Qaiku, identi.ca, etc.), blogs, location-based applications (e.g., Foursquare, Geoloqi, Gowalla, The Hotlist, etc.), social networks (e.g., Facebook, Google+, LinkedIn, MySpace, etc.), multi-media applications (e.g., Flickr, Photobucket, Picasa, YouTube, Vimeo, Viddler, Sevenload, Dailymotion, Pinterest, etc.), and/or any other social media platform where users are able to upload text, photos, videos, audio clips, other data, and/or combinations thereof. As members of the local audience 104 and the remote audience 106 post to the social media applications 110, the posts can be gathered, evaluated, and selectively incorporated using the devices, systems, and methods of the present disclosure to enhance the event experience for both the local and remote audiences, increase the social-media profile of the event, and provide relevant analytics about the event.

In that regard, the arrangement 100 includes a platform 112 that is connected to the network 108 such that the platform 112 can access the plurality of social media applications 110. As discussed in greater detail below, the platform 112 is configured to monitor posts made to the plurality of social media applications 110 that are related to one or more events. The platform 112 includes at least one computing device (e.g., server, desktop computer, tablet computer, laptop computer, netbook, smart phone, PDA, and/or other suitable computing device). In that regard, in some particular instances the computing device is programmed to execute steps associated with the data acquisition and analysis described herein. Accordingly, it is understood that any steps related to data acquisition, data processing, instrument control, and/or other processing or control aspects of the present disclosure may be implemented by the platform 112 using corresponding instructions stored on or in a non-transitory computer readable medium accessible by the platform. In some instances, the platform 112 consists of a plurality of computing devices. In that regard, the plurality of computing devices are in communication with one another and/or linked via one or more master controllers, in some instances, to synchronize performance of the plurality of computing devices. Further, in some instances, the platform 112 is part of a cloud-based computing system. Accordingly, the platform 112 is accessible by any type of web-enabled device in some embodiments.

In some instances, the platform 112 aggregates the posts for review by one or more moderators and/or curators. In that regard, the one or more moderators and/or curators review the posts via one or more control panels. In the illustrated embodiment of FIG. 1, arrangement 100 includes five control panels 114, 116, 118, 120, and 121. Generally, the control panels 114, 116, 118, 120, and 121 may be any type of computing device that is capable of communicating with the platform 112 either directly or over a network, including wireless and/or wired connections. As noted above, in some instances the platform 112 is part of a cloud-based computing system and, in such instances, the control panels 114, 116, 118, 120, and 121 access the platform 112 by accessing the cloud. In some instances, the control panel is a tablet computer, laptop computer, netbook, desktop computer, smart phone, PDA, and/or other suitable computing device. In FIG. 1, control panels 114, 116, and 118 are shown as being local to the event, while control panels 120 and 121 are shown as being remote to the event. Generally, any number combination of local and remote control panels may be utilized, including no remote controls or no local control panels.

Utilizing the control panels 114, 116, 118, 120, and 121, one or more feeds or streams of information can be output based on the moderated, curated, and/or enhanced posts to the plurality of social media applications. As shown, the event 102 includes at least three displays 122, 124, and 126. In that regard, at least one of the displays 122, 124, and 126 is configured to display the one or more feeds. In some instances, the displays 122, 124, and 126 configured to display the same information. In other instances, at least one of the displays 122, 124, and 126 is configured to display information different than at least one other of the displays. Further, in some instances, at least one of the displays 122, 124, and 126 is a remote screen positioned outside of the event (e.g., outside of the stadium, in another city, etc.). In addition to the displays 122, 124, and 126, the one or more feeds or streams can be displayed over the network 108, as indicated by broadcast 128. In that regard, in some instances the one or more feeds or streams that make up the output 128 are specifically targeted at (or curated for) the remote audience 106. In short, the platform 112 is configured to moderate and/or curate the posts based on the target audience. For example, in some instances content relevant to the local audience 104 will be irrelevant and/or not applicable to the remote audience 106 and vice versa. Accordingly, in such instances, the content used for the feeds and/or streams that are broadcast to the local audience will be different than the content used for the feeds and/or streams that are broadcast to the remote audience.

For the sake of clarity and brevity in understanding the present disclosure, the majority of the detailed description below is described in conjunction with a single social media platform, in particular a single micro-blog application such as Twitter. However, it is understood that the concepts described herein can be similarly applied to any other social media platform and/or across a plurality of social media platforms.

Users & Permissions

Generally, the social media management platform of the present disclosure is activated and managed by approved administrators and users. In some embodiments, the platform has different user levels. In that regard, the different user levels have corresponding levels of control. In some particular embodiments, the platform has four levels or permissions that allow users different control and access at each level. These sets of rules and permissions ensure the correct operations are performed at the right time by the right people with full transparency of activity throughout the entire process.

The platform keeps track and writes to a database all interactions that occur with the platform. The USERS menu and control options available to a particular user are dictated by the user level set by the L1 Super User(s). The L1 Super User(s) has access to every control in the platform and with that control can setup all the various permissions for each different level of user. Likewise the L1 Super User(s) designates and can create new users at the level desired. In one embodiment of having four different user levels, the various levels of control breakdown as follows: L1 Administrator—Super User/Developer full access to everything, anywhere, anytime; L2 Editor—Admin of the platform with full operational access to every client, every user, and every stream; L3 Author—Stream Controller—this user has access only to an authorized event/stream but can control all attributes around that event; and L4 Contributor—Moderator/Curator—this user is just given access to moderate/re-moderate and curate/re-curate as well adjust timelines of playback of "enhanced" content. In some instances, every action within the platform is traceable back to the specific user by any higher-level user.

Figure 2:
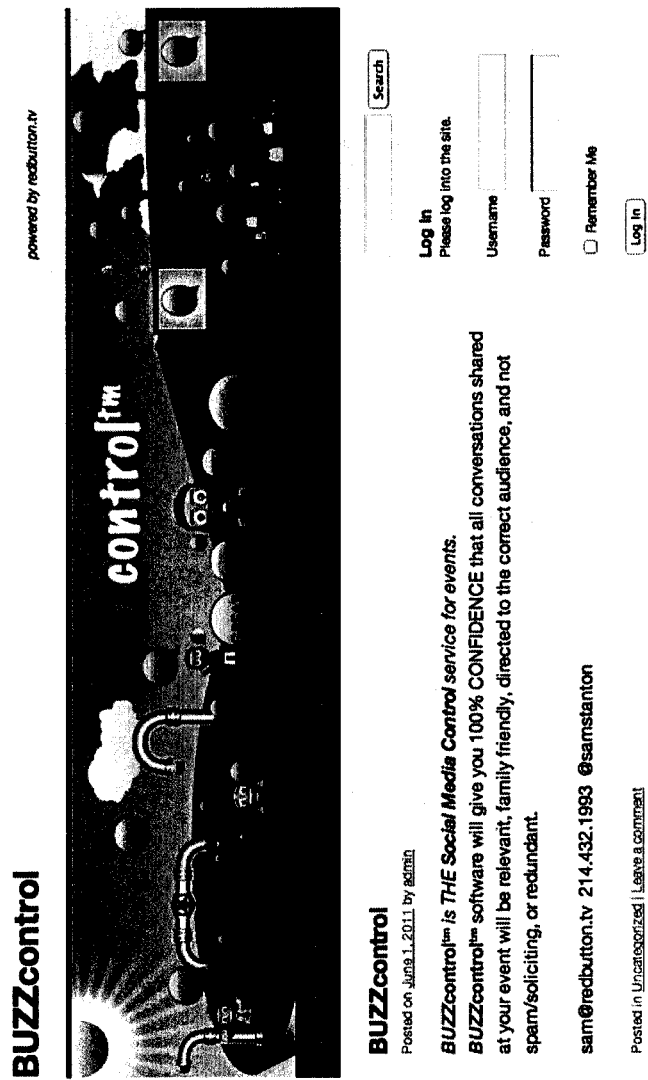
FIG. 2 is a screen shot illustrating a login screen according to an exemplary embodiment of the present disclosure.
Figure 3:
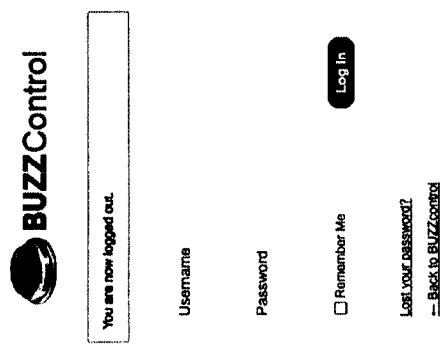
FIG. 3 is a screen shot illustrating a login screen according to another embodiment of the present disclosure.
Figure 4:
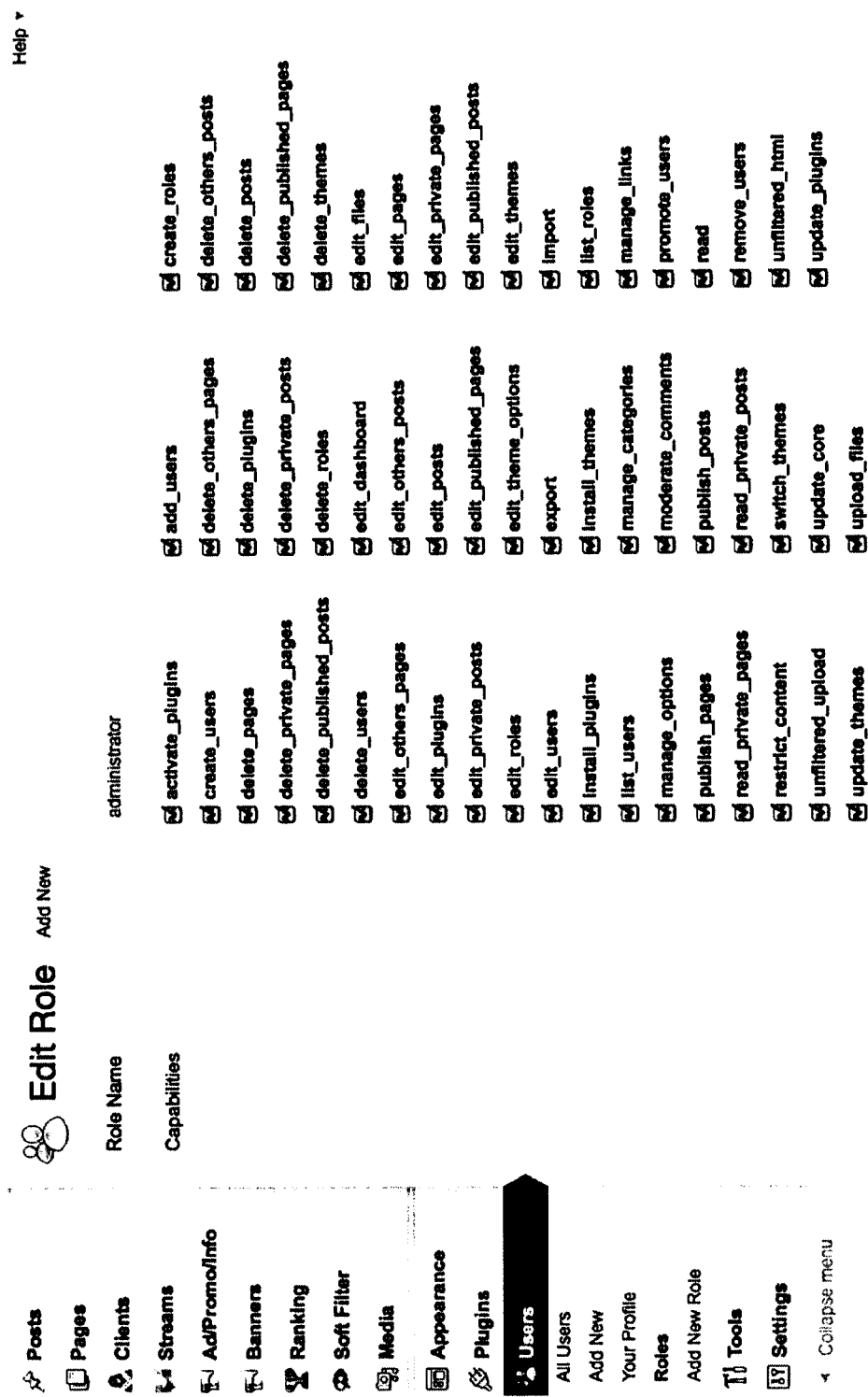
FIG. 4 is a screen shot illustrating selectable capabilities of a user according to an exemplary embodiment of the present disclosure.
Figure 5:
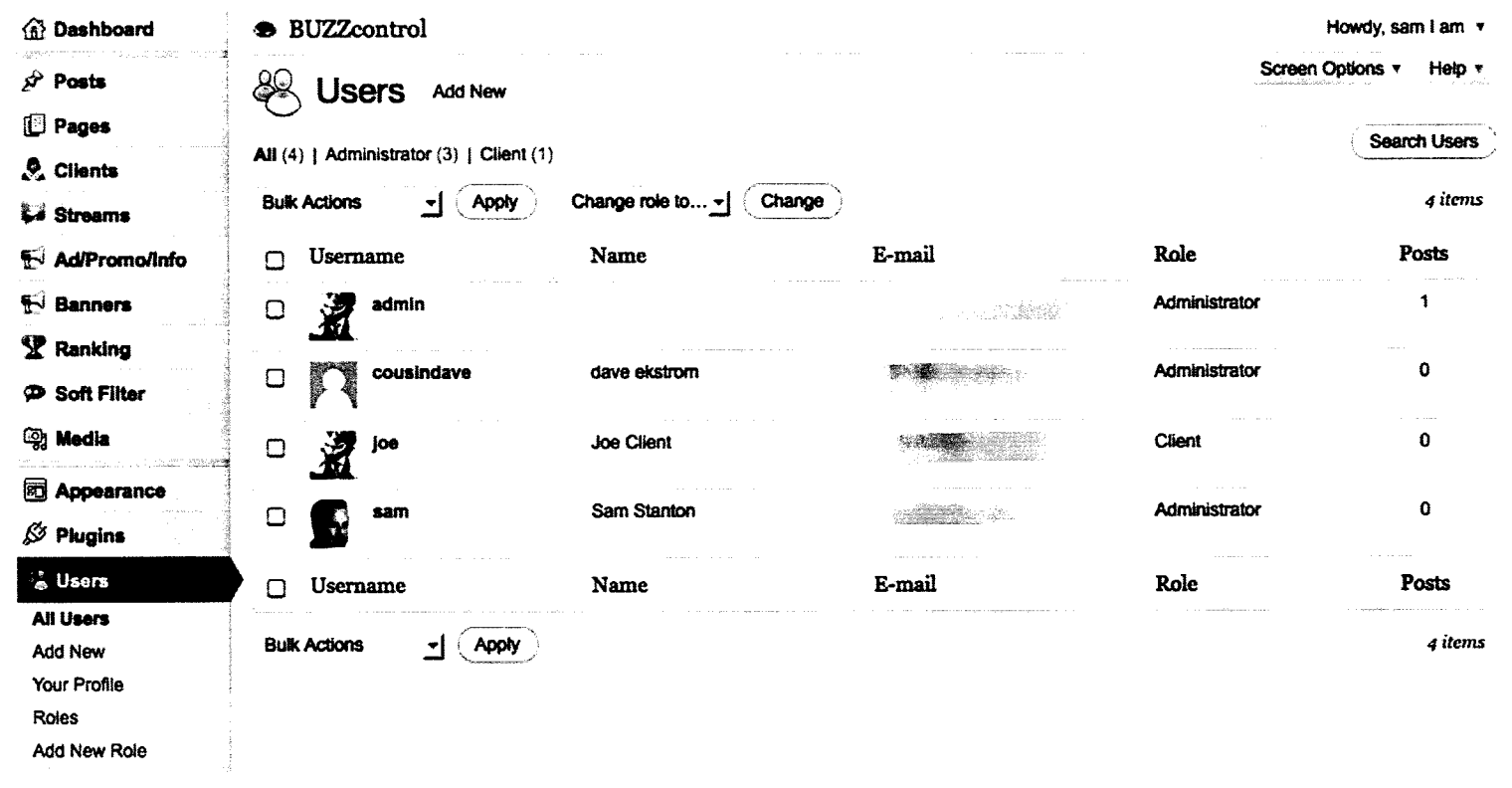

When a user visits the platform's URL or other access point they'll be asked to sign in. FIGS. 2 and 3 illustrate exemplary login screens where the user will be asked to sign in. If the user is already registered in the system, the platform will immediately direct them to the control area designated for their status level. If the user is not registered in the system, then the user will need to request registration from an authorized user (e.g., L3 or higher user). A user's profile is created and can be modified with every engagement with the system (e.g., increased authority or responsibility over time). In that regard, FIG. 4 illustrates a plurality of selectable capabilities of a user according to an exemplary embodiment of the present disclosure. The use of a multi-level user platform with corresponding permissions ensures that the entire social media management process stays under control and that additional users can be added and managed efficiently. FIG. 5 illustrates a list of users currently logged into the platform in accordance with one embodiment of the present disclosure.

Aggregate/Capture:

The incorporation of social media into an event begins with the aggregation of all the communications and conversations happening in and around the event. In that regard, in some instances it is important that there is a continual search and real time, or approximately real time, capture of all the postings and mentions. If postings and mentions are returned minutes later instead of seconds later they can become irrelevant. Current manual searches via search websites (e.g., search.twitter.com) for keywords and hashtags give results in a reasonable amount of time. However, after several requests are made using these methods, the search engines and/or the servers culling the requests begin to throttle and limit time-intervals as well as the amount of requests that can be made from a particular server per hour, which limits the instant real time results that make social media so engaging.

The platform addresses this need for real time postings, by creating one or more standing searches that are managed/scheduled/served over numerous globally positioned nodes all with unique IP addresses. In that regard, the different nodes can send requests in sequential order to limit the frequency of requests from any one node. This results in a constant real time stream of responses fed back to the platform, achieving the real time moderation, curation, and presentation of social media posts. Because multiple nodes with unique IP addresses are placing these requests in timed intervals managed by the platform that coincide with the request limits of the search servers, no blocking or denial of service is experienced for the nodes. In some instances, it is necessary to manage the nodes. In that regard, the status of the various nodes is monitored to ensure proper performance of the nodes. In some instances, the monitoring of the nodes is performed manually by a human user. In other instances, the monitoring is performed automatically and any inconsistencies or potential problems are reported to a human user via an alert.

Figure 6:
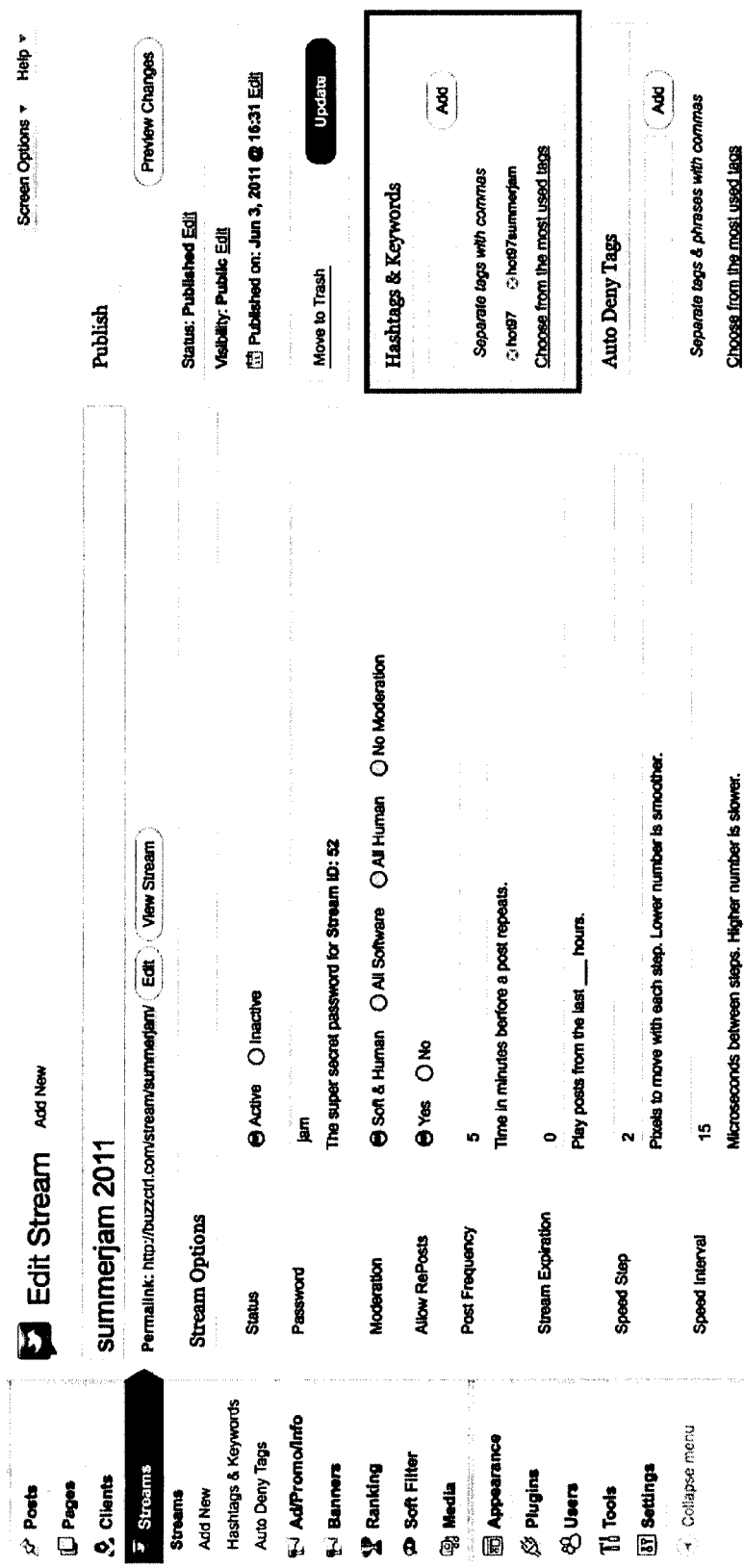
FIG. 6 is a screen shot illustrating control options related to a stream according to an exemplary embodiment of the present disclosure, where a particular control option is highlighted.
Figure 7:
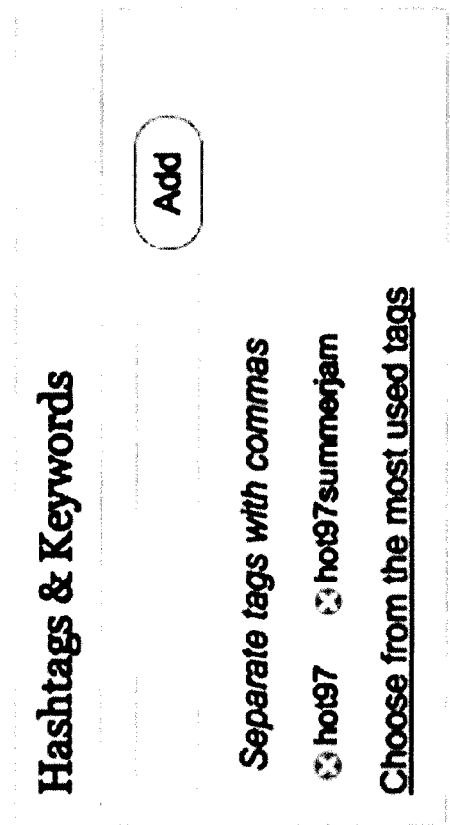
FIG. 7 is a magnified view of the highlighted control option of the screen shot of FIG. 6.
Figure 8:
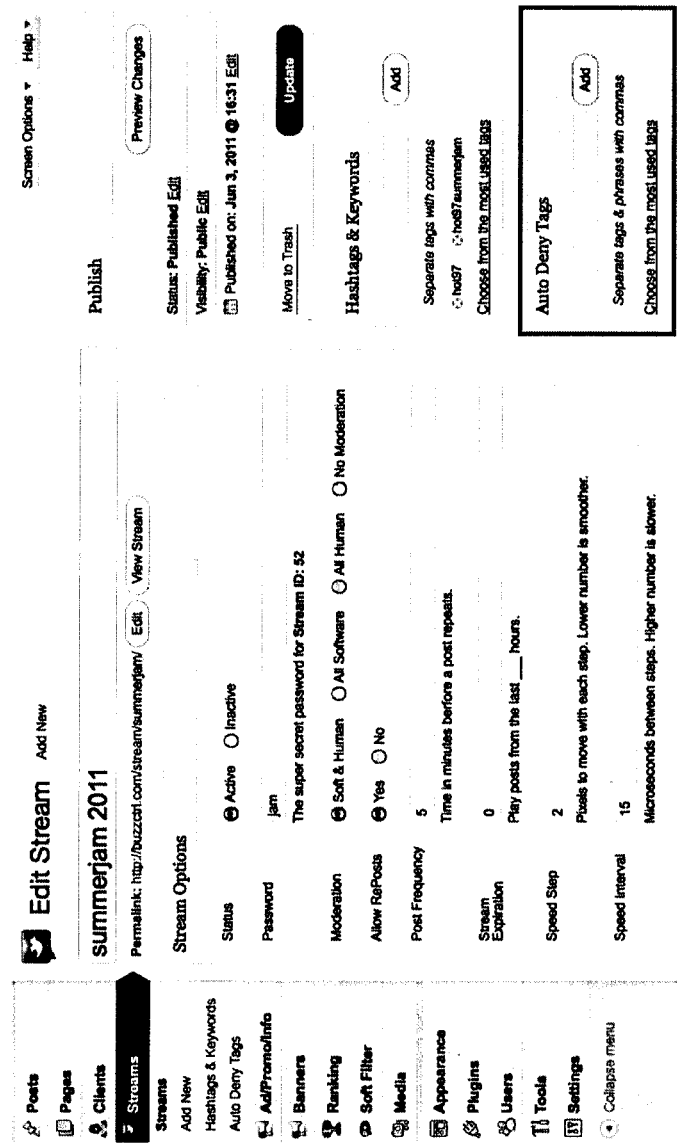
FIG. 8 is the screen shot of FIG. 6, but with an alternative control option highlighted.
Figure 9:
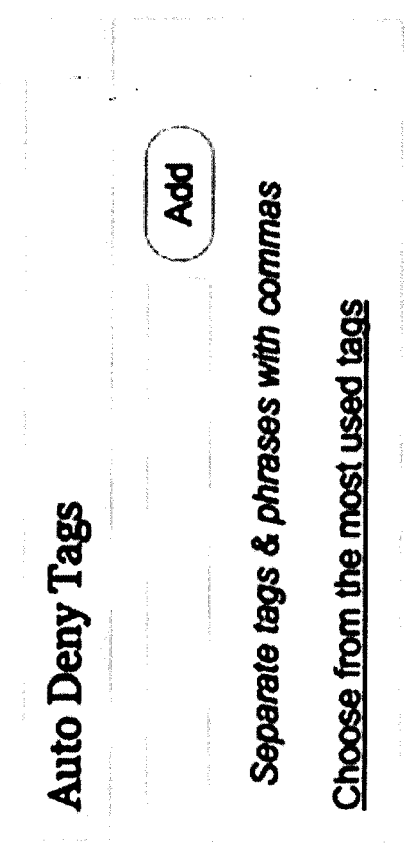
FIG. 9 is a magnified view of the highlighted control option of the screen shot of FIG. 8.

To begin capturing social media posts related to an event, a user logs in to the platform and goes into the stream control area or tab of the user interface to set up the capture requests. As shown in FIGS. 6 and 7, in the stream control area of the platform user interface, a user is able to enter the main publicized or promoted hashtags and keywords that have been designated for or are associated with the event. The hashtags and keywords are what the platform utilizes to retrieve relevant posts from the social media applications. In some instances, the hashtags and keywords are selected in a manner to allow capture of most, if not all, of the posts related to an event. However, setting such a wide net for the search parameters can result in literally millions of returns, many of which have no relevancy to the event. Accordingly, in some instances, the stream control area of the platform user interface also allows a user to enter nullifying keywords or deny tags. FIGS. 8 and 9 illustrate an exemplary embodiment of an input mechanism that allows the user to enter the deny tags for the event. If the words or hashtags are identified in the search returns, then the posts associated with them will be dropped from the findings. In this manner, the deny tags provide a first level software filter to the results.

All captured and first level filtered results are written to one or more platform servers to be accessed leading up to, throughout, and/or after the event. In many social media programs and/or applications, posts have a short lifespan (e.g., 7 days). Accordingly, if they are not captured and stored in some fashion, they will not be documented or contribute to the long-term legacy or analytics of the event. The archiving of these captured posts allows the social media management platform of the present disclosure to provide detailed accounts of the social media posts surrounding an event that can be analyzed for data and information during and long after an event has ended. In some embodiments, all posts related to an event (i.e., by hashtag and/or keyword(s)) are archived for later analysis and/or data mining.

Skim, Converge, & Recruit

Social media can be used for numerous reasons in the context of an event. One common reason is to build a following and by doing so an online reputation for the event. The social media management platform of the present disclosure can greatly assist in that endeavor with the Skim, Converge, & Recruit functionality. When the platform is setup for an event, an option is provided that allows activation of a feature that reaches out to those who are posting about the event but haven't used the publicized hashtag(s) assigned for the event and invites them to join in by using the hashtag(s) for the event going forward. Once made aware, most posters normally jump on board and include the organized hashtag(s) in their subsequent posts.

Online reputations are built and measured in several ways. It, of course, always starts by sharing interesting, entertaining, relevant content, and doing so will result in a following of people interested and engaged. Most social network activity is very reciprocal, meaning that if one individual "follows" another, the action is normally returned. If the event/entity is interested in increasing their following, the social media management platform of the present disclosure can automatically follow all those who engage in the event's conversations. Doing so instantly and dramatically increases the event's following and reputation in the social media communities.

To engage a larger audience, the 2nd level tags and keywords can be activated. The platform user enters 2nd level tags and keywords that may pertain to the event. For example, for a rock concert the main hashtag might be #SJ11NYC (Summer Jam 2011 New York City) but in addition a user might also enter "Meadowlands" where the concert is performed, "Lady Gaga" a performer plus others and their nicknames, "Hot97" the sponsoring radio station, "RedBull" the advertising sponsor plus others. In some instances, the platform queries all posts captured via the keyword search (i.e., posts that didn't use the event's hashtag(s)) to determine whether the poster has had previously approved post. With each poster's initial approved post, the platform can automatically send a message to the poster thanking them for mentioning the event and invites them to join the conversation by using the appropriate event hashtag(s). Further, if growing the event/entity's following is important, the platform can automatically follow each and every poster whether they used the publicized or the secondary hashtags, along with a message thanking them for their contribution. This action typically results in a reciprocal follow.

If the 2nd level tag search is activated, a moderator or other user can create an invite/message that is auto shared. The message invites the poster to join the conversation by adding the event's hashtag(s) to their posts. This message will be forwarded after each first post for the poster has been moderated. In that regard, a "welcome follow" feature of the social media management platform is activated in some instances. In that regard, every first time poster to the event (whose post is approved) is auto followed, liked, +'d or whatever the particular social media application's nomenclature is. This action inevitably reciprocates a follow back increasing the event/entity's impact and following. The platform user can also activate the "thanks we're following you" message as well, which further reinforces the follow.

Moderation & Curation

Another important attribute of the platform is the ability to moderate and curate the content that will be shared with attendees, customers, fans, participants, guests, and the public in general. Moderation of the content allows any unsuitable content to be filtered out and removed. By moderating the content in accordance with the present disclosure, an event is protected from the possible promotion and/or encouragement of non-family friendly, non-event friendly, off-topic, solicitous, off brand/message, non-corporate/politically correct, and/or other unsuitable posts (e.g., profane or vulgar) that would cause the use of social media to be too big of a liability for use in conjunction with the event. Another big impact moderation makes is in the reduction of follower fatigue from redundant duplicitous posts. Likewise reposts can be allowed or disallowed depending on program desires. Moderation of the posts keeps the event/entity's stream and followers' interest fresh and engaged.

Curation, on the other hand, ensures that the posts are relevant for the audience that will be receiving the posts. In that regard, curation includes the organizing and segmenting of the posts based on context and relevancy to target audiences. The curated posts can then be directed to the exact and specific intended audiences such that each audience receives content that is germane to them. The platform's curation process gives events/entities the ability to separate relative content from all the conversations and posts taking place and direct this refined, organized content to specific targeted audiences. In that regard, in some instances the different target audiences for a particular event are setup and defined by a user. The target audiences can be defined based on a variety of factors including, without limitation, additional #hashtags or mentions, subject matter (e.g., artist, educational, topic/subtopic, etc.), particular characteristics or behaviors, location (e.g., proximity to the event, geographic location, and/or following location (e.g., at the event vs. online)), online influence, age, gender, various types of measured activity, and/or other characteristics for defining an audience. With the target audiences defined, a user can select which audience(s) a post is relevant to and the post will be broadcast to the selected audience(s). The use of platform's moderation and curation processes gives an event/entity the confidence that the inclusion of social media will be under control. Simply put, the platform's moderation techniques filter out the noise, while the curation techniques ensure the most relevant content is delivered to the intended audiences.

Figure 10:
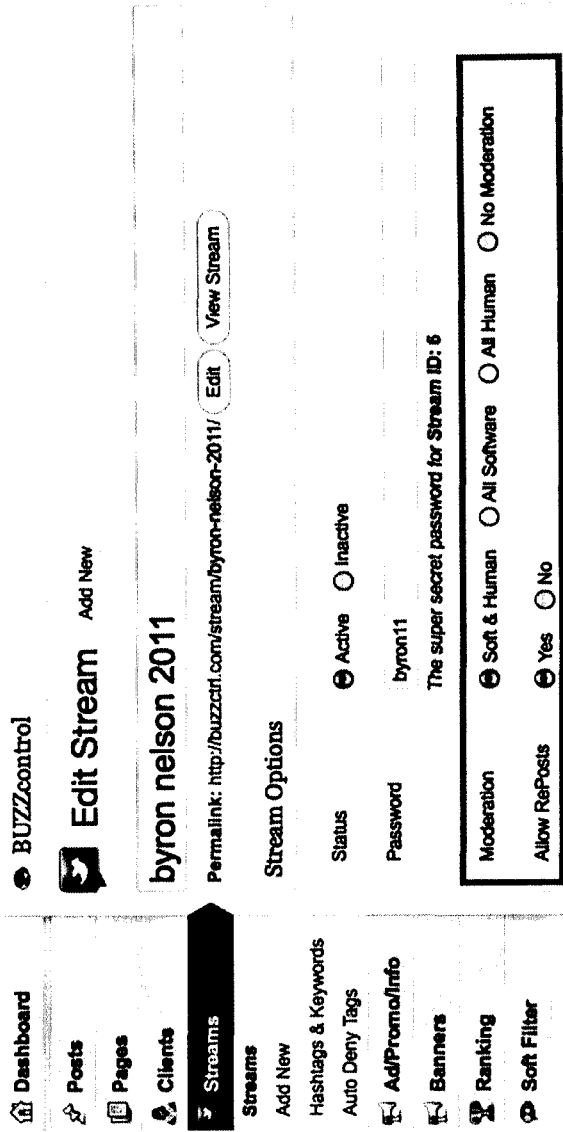
FIG. 10 is a screen shot illustrating control options related to a stream according to another embodiment of the present disclosure.

In the platform an authorized user (e.g., lever L3 or higher in some instances) can engage the automatic first level software profanity/vulgarity filter. This filter instantly denies a post containing any profane or vulgar words found in the ever growing soft filter database. The "soft filter" acts as the first line of defense to undesired posts. After incoming posts have gone through the soft filter the platform user is able to begin confidence or human moderation and curation. In that regard, human moderation and curation often includes visually inspecting and approving or denying each and every post to ensure all approved posts are on point. In that regard, once the capture has occurred of relevant social media posts the user(s) begins the moderation of all posts. As shown in FIG. 10, in some embodiments, once a user(s) is logged into the platform, the user(s) has several options to choose from, including (1) No Moderation—all posts are shared instantly after being captured; (2) Soft Moderation—all post are run through the "applications" software filter "soft filter" to filter out any profanity or vulgarity; (3) Human Moderation—after capture, every post is presented to the user to moderate and/or curate visually; and (4) Soft & Human Moderation—each post is first run through software filters and then each visually moderated and/or curated by the user.

Figure 11:
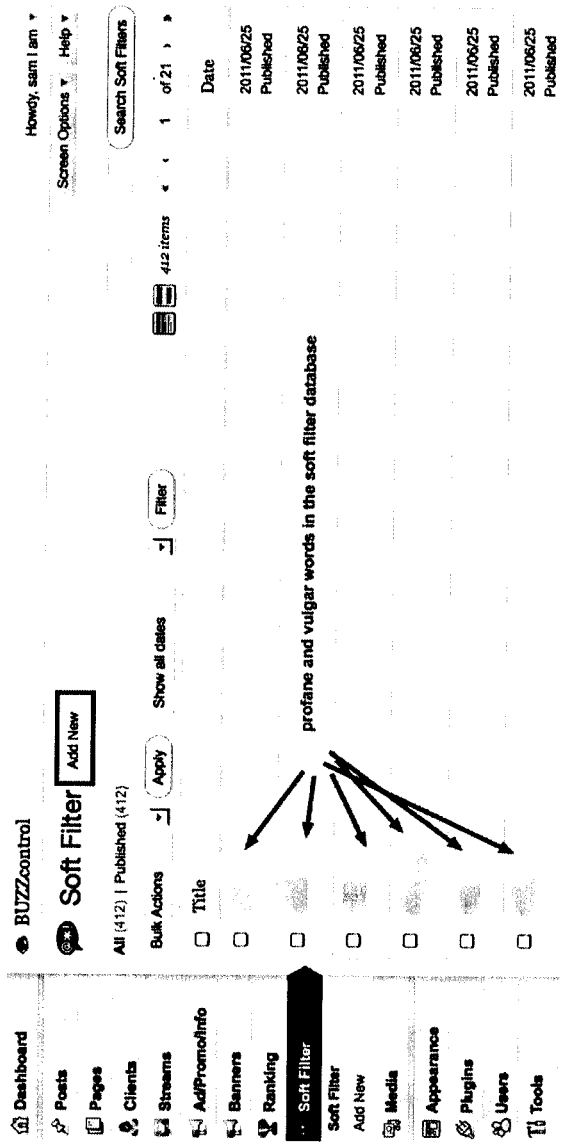
FIG. 11 is a screen shot illustrating aspects of a soft filter according to an embodiment of the present disclosure.

FIG. 11 illustrates a listing of the words and phrases that are included within the platform's soft filter, including profane and/or vulgar words and phrases along with the deny or negative tags discussed above. Additional words and phrases can be added to the filter over time, including during an event. For example, if someone was trying to heavily advertise or spam the audience with repetitive posts, a simple negative tag/keyword added to the negative tag filter would deny any/all posts with that word/tag/phrase. Also, the words and phrases included in the filter can be tailored for a particular event. For example, in some instances the amount of filtering is greatly increased for a family event compared to an adults-only event. In some instances, the platform includes a plurality of pre-programmed or pre-defined filters of different levels that a user can choose from for a particular event.

Figure 12:
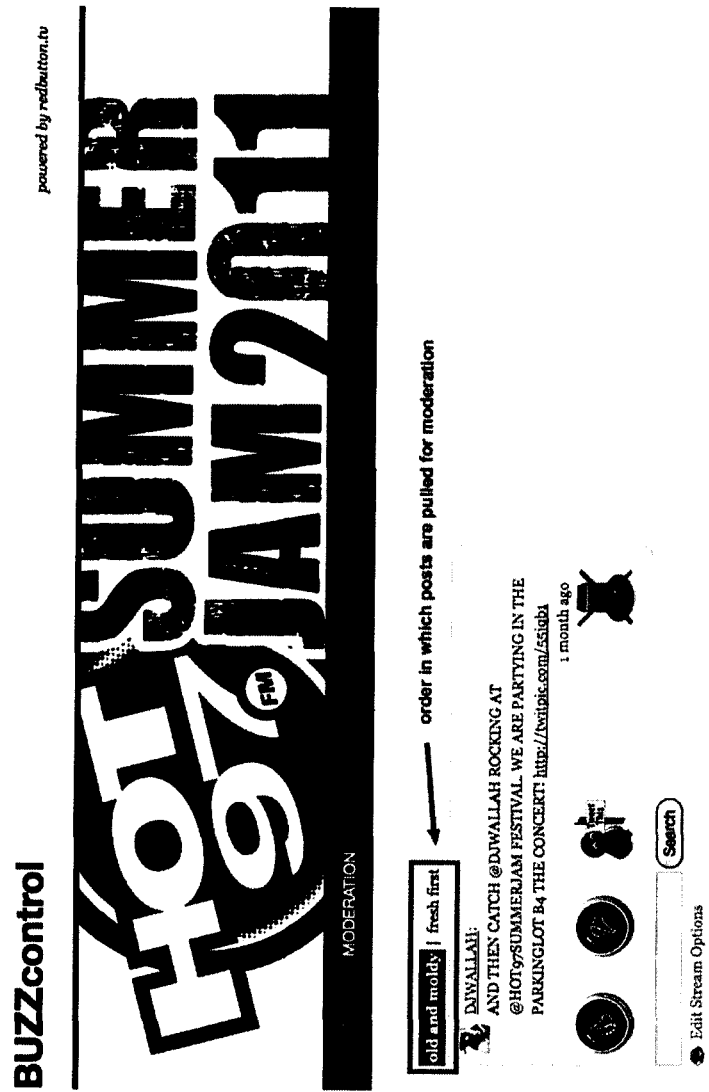
FIG. 12 is a screen shot illustrating control options related to a stream according to another embodiment of the present disclosure.
Figure 13:
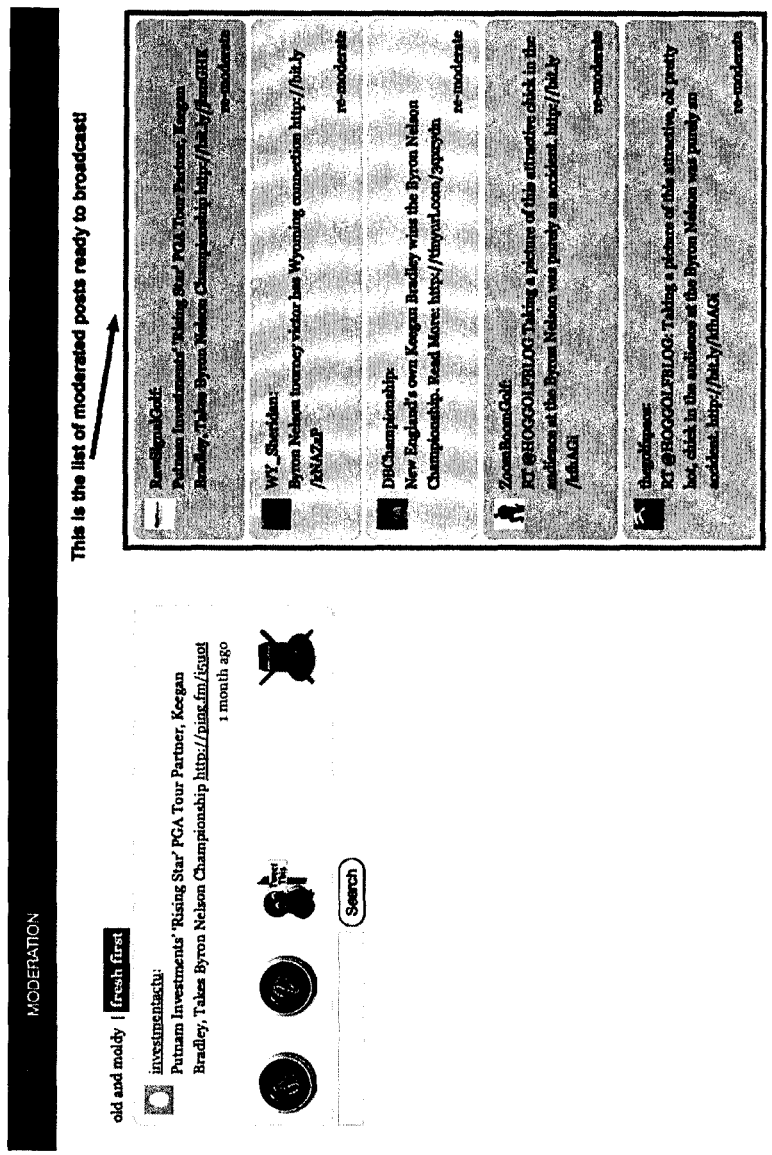
FIG. 13 is a screen shot illustrating a list of moderated posts for use in a stream according to an embodiment of the present disclosure.

Once the posts have passed through the soft filter, human moderation and/or curation can be utilized to ensure everything is "safe" and/or relevant for all audiences. In some instances, a user is able to choose the order in which the user would like to receive the posts to moderate and/or curate. In some instances, the user is able to choose between either Newest (which places the most recent un-moderated and/or un-curated posts at the top of the queue) or Oldest (which places the oldest un-moderated and/or un-curated posts at the top of the queue). FIGS. 12 and 13 illustrate examples of these choices. To prevent redundancy in the human moderation and/or curation of the posts and increase the speed of review, the users logged into the system are placed in a hierarchy. For example, in some instances the first user logged in and/or the highest-level user is designated as the MASTER. All subsequent platform users logging on to moderate and/or curate are designated as SLAVES and receive their posts to moderate and/or curate from the priority list the MASTER has created. Should a MASTER retire or not be active for a set period of time (e.g., 20 minutes), then the next most active SLAVE (or highest-level user remaining) then becomes the MASTER. This hierarchy and authority level designation ensures that redundant moderation and/or curation does not occur.

When the platform user is moderating and/or curating posts, they are presented a moderation and/or curation screen containing such things as poster profile avatar, poster profile name, poster post, poster posted, poster links, poster linked photos/video, and/or other information related to the poster. Based on the user's review of the information provided, the user determines how the post should be handled. The available options for handling the post can vary from event to event. In some instances, the user is provided with one or more of the following options: APPROVE—puts the post in queue to be played in the stream; FAST TRACK—approves the post and elevates the post to the next to broadcast position in the queue line of the stream; DENY—denies the post from being played in the stream; CURATED AUDIENCE 1, 2, . . . N—posts assigned to particular audience(s) that are setup and designated in stream settings based on subject matter of posts, location either geographically (e.g., at the event or within a certain distance) or virtually (e.g., different networks online), and/or various other designations, which allows the different audiences to receive content relevant to them. BROADCAST & REPOST—if a post has relevancy to an online audience as well as the on site audience, repost allows the post to be reposted via the event's own social media account(s) (this can be designated for both on site and online simultaneously); REPOST ONLINE ONLY—puts the post in queue to be played in an online stream, but not any of the on site streams; and BLOCK POSTER—all future contributions from that poster will be blocked. Reasons for denying a post or blocking a poster include: Off topic/name/brand—a visual, human, confidence moderation and/or curation allows for full understanding of the context of the posts far beyond what a mere software word filter could ever do; Solicitous/SPAM—not approved, promotional in nature, posts attempting to capture or convert the audience or engagement away from the event; Not politically/corporately/event correct—any post that sheds a negative light on the event or its leaders, and/or would derail or misdirect engagement; Redundant—for the most part all reposts of original content posted for the event are denied (without this option, an original interesting, informative, entertaining post could be reposted again and again over saturating a follower causing serious fatigue and loss of interest by an audience). Once a post has been moderated and curated it is placed in queue for broadcast over one or more streams associated with the event. At any time during an event the platform allows for any moderated post to be searched and recalled for re-moderation.

Advertisement, Promotion, Information Inseration, & Banners

The social media management platform of the present disclosure creates a "clean", noise free, controlled, stream of content that can be shared with an audience both onsite and online. Inside this stream, ads, promos, and/or info bulletins can be inserted. The platform contains a very robust media management and scheduler system to place these insertions. Each and every insertion can be measured for various parameters, such as effectiveness, exposure, and action success. The qualitative placement of information inside such event participant relevant content has tremendous value. This isn't simply a popup promotion; this is an offer or information embedded into the middle of event participant created content that all eyes are focused and tuned in to. This is also an actionable audience, meaning that much of the time the audience onsite is following on devices (smart phones or tablets), while offsite followers are obviously following online, which allows for instant engagement or acceptance of offers in some instances. Custom animated banners can also be overlaid on top of the on-site full screen broadcasts. Ads/Promos/Information are often already served in the enhanced content on the screens, but the animated banners attract additional attention and are normally used to drive engagement. Strategically placed ads now have tremendous exposure to the exact desired and qualified audiences, where all interactions are measured in real time.

Figure 14:
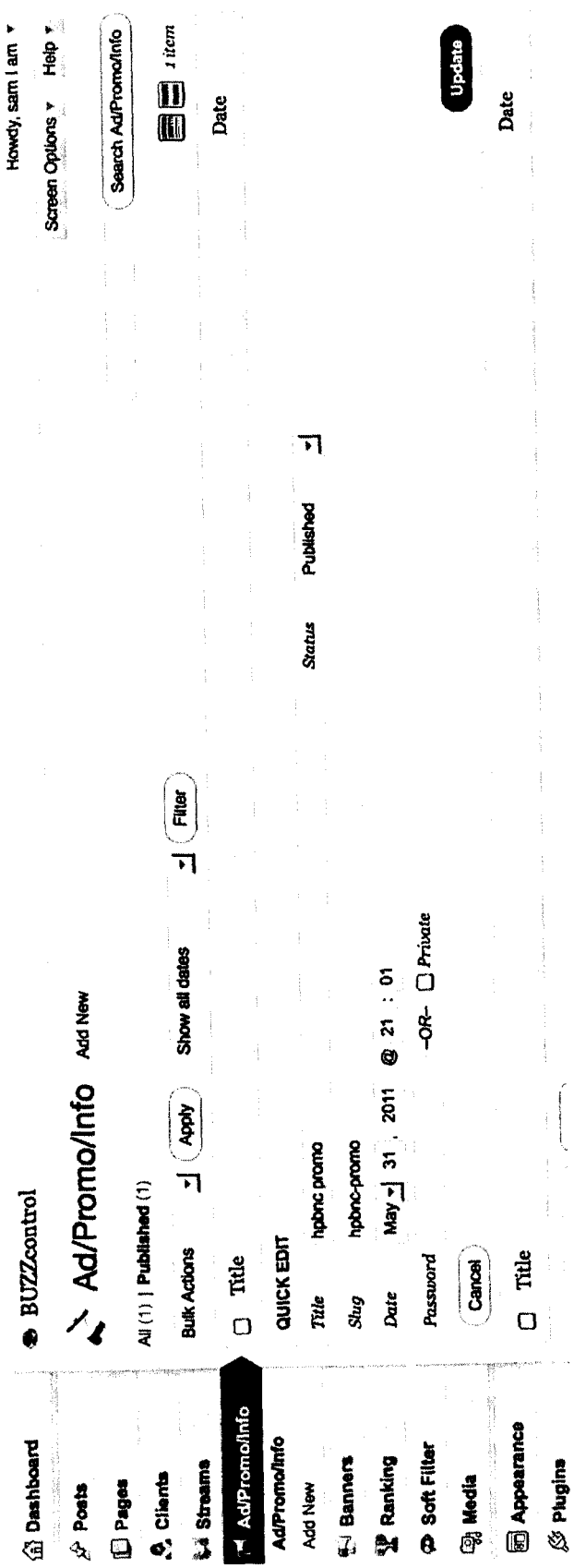
FIG. 14 is a screen shot illustrating control options related to an insertion of information into a stream according to another embodiment of the present disclosure.
Figure 15:
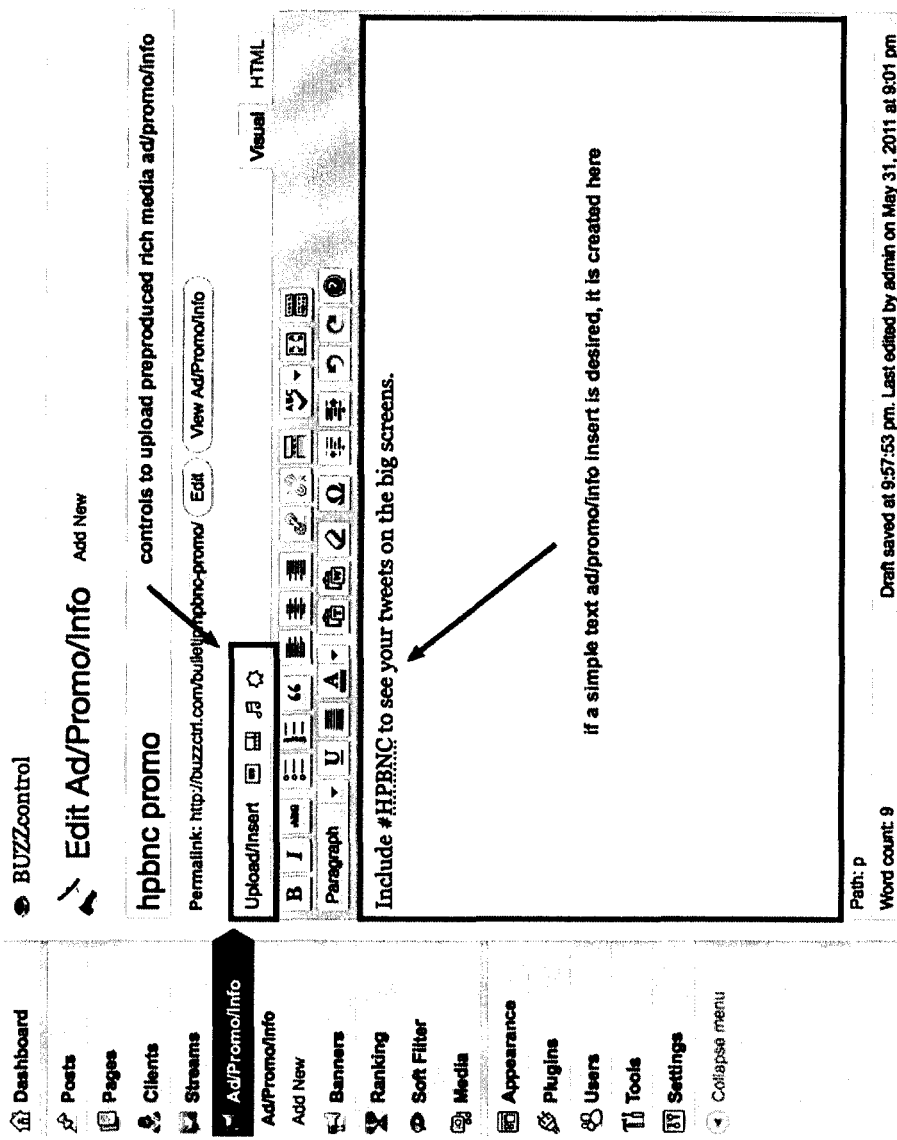
FIG. 15 is a screen shot illustrating control options related to the insertion of information into the stream according to an embodiment of the present disclosure.

Within the AD/PROMOS/INFO & BANNER control area of the platform user interface, a user can create and setup such insertions and banners. In that regard, an authorized user (e.g., an L3 or higher user) can view all insertions ordered, delete insertions, edit insertions, request reports on previous run insertions or create new insertions. There are several parts to this process. First is the creation and/or upload of the media to be inserted. If it is merely text, a simple HTML editor is available within the user interface. Accordingly, the user creates the text insert that is then stored in the database (or other memory) for a particular stream. The user is also given the ability to upload media for insertion. This media can be in the form of .jpg, .swf, .png, .tiff, .mov, .wmp, and/or any other audio and/or video formats, and/or combinations thereof. The media is also stored to the database (or other memory) for a particular stream. A similar arrangement is utilized for banner creation in the BANNER section of the platform user interface. FIGS. 14 and 15 illustrate exemplary embodiments of such an AD/PROMO/INFO portion of a user interface according to the present disclosure.

The second step in the insertion process is scheduling. In that regard, the user can decide whether the insertion should be placed in stream based on time, inactivity, location, interests, past history, user fatigue, and/or other mechanisms. Time setting typically requires a start and end, and then a choice of frequency once activated. For example, start inserting the ad/promo/info at 9 am on July 2, insert it every 10 minutes there after until 9 am on July 3. FIG. 16 illustrates a time based scheduling of insertions. Another scheduling type that can be used is based on Inactivity or lack of new contributions. The platform measures how long it has been since a new moderated post has been approved. Once it has reached a determined threshold the insertion is made and insertions are repeated at whatever frequency is requested until the End Time is reached or until approved posts resume. FIG. 17 illustrates an inactivity based scheduling of insertions. Further, in some instances, the insertions are targeted to specific audience members. In some instances, the targeting is based upon location, interests, past history, and/or user fatigue.

Figure 18:
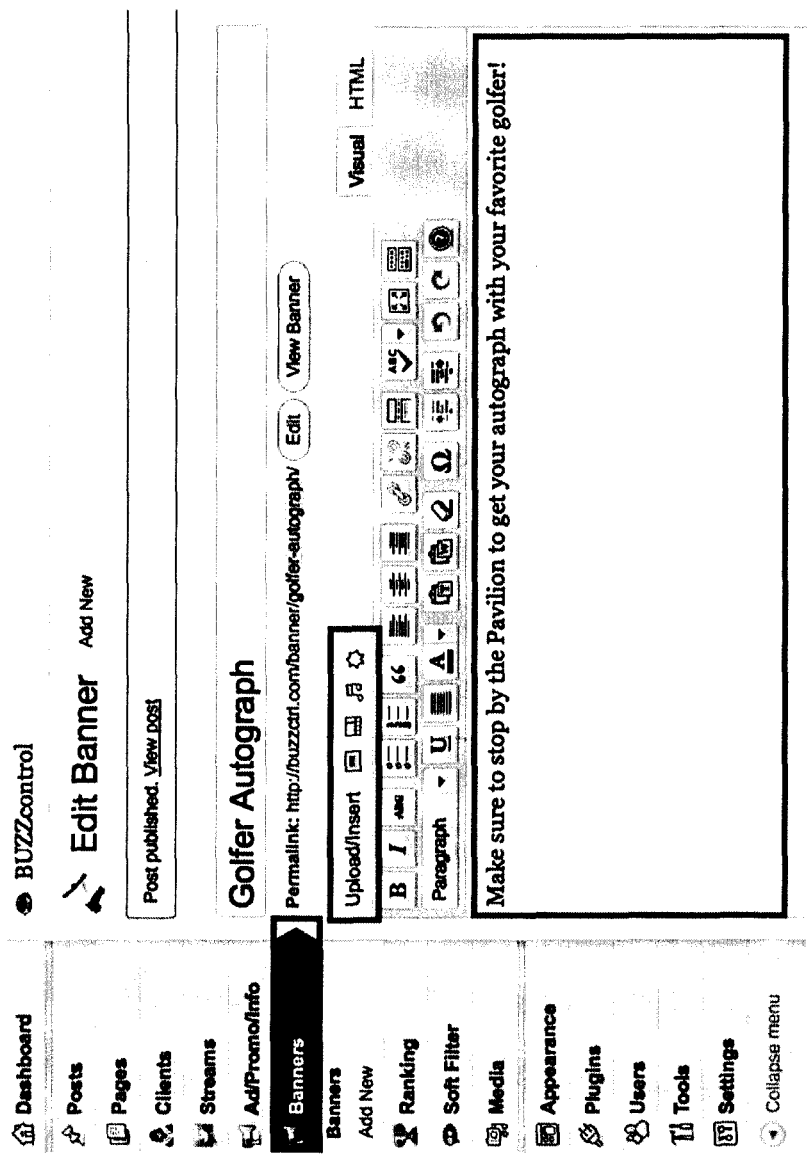
FIG. 18 is a screen shot illustrating control options related to a banner according to an exemplary embodiment of the present disclosure.

During an insertion and at the completion of an entire insertion campaign a record is sent to the platform and/or stored in memory (e.g., in the platform's database) to allow for both real time and post campaign metrics and analytics. Banners are created and scheduled in a similar manner to the Ad/Promo/Info insertions. However, in some instances, the banners are displayed only on the bottom of the full screen broadcasting that occurs on site. Banners are created and scheduled in the BANNER section of the platform's user interface. In that regard, FIGS. 18 and 19 illustrate exemplary user interfaces related to the creation and scheduling of banners.

At any point an authorized user can select a specific campaign and request a metrics report. When the report button is selected the user has the choice of which insertions to select for the report. The choice of whether to combine several insertions for a particular client or keep each insertion separate. For example an advertiser might have placed 5 different ads, if so they have the choice of getting one report for the activity of all ads together, each ad on its own, and/or subsets of the ads. The reports can return information on many different metrics including but not limited to: type of ad/info (text, rich media); number of audience members served to (either onsite or online); number of impressions; number of reposts and re-mentions; number of click-throughs; and/or other measurements of an ads effectiveness and/or reach. Another form of advertising/promotion can be utilized within the container or display mechanisms that house or visualize the posts. All visualization options whether it is full screen or partial screen have the ability to include sponsor logos or branding that can be viewed continually or on an intermittent basis, which facilitates further tying of the brand/sponsor with the socialization occurring. In some implementations, advertisers' images, logos, products, or other information is presented as the background imagery during full screen display with the real-time moderated content playing over the background. Such implementations accomplish the desires of the advertisers to be omnipresent and the posters to always have fresh posts playing.

Rank & Recognize

Everyone likes to have status and recognition, and even more so amongst their peers and friends. The social media management platform of the present disclosure acknowledges and encourages this in REAL TIME to further engage and energize participants both on site and online. While the platform is capturing all the posts, it simultaneously gathers and records info about the posters. This information is valuable in discovering who an event's audience is and what their habits, interests, and following is online. In some instances, online status measurements are taken into account. For example, a poster's status relative to the event is considered in some instances. The status relative to the event is measured by the amount of posts and/or reposts that have been attributed to the poster's particular account(s) in the context of the event. In some instances, the posters are ranked based on their status relative to the event. The ranking of users at an event is stored in the platform's database in some instances. As each post is captured it is written to the database. Each post written to the poster's account is noted. Likewise each time a poster's post designated as an "event post" is reposted, the original poster gets credit. In some instances, the poster's ranking is queried and presented whenever a post from that poster is broadcast. In that regard, in some instances an authorized user (e.g., L3 user or higher) determines and defines ranking milestones for an event within the platform. For example, in some embodiments each milestone is represented with a unique icon and all subsequent postings until the next milestone is achieved will be designated with a similar icon and/or look and feel. Sharing and promoting the ranking at the event spurs on more competition between the posters to increase their ranking and thus increases activity and engagement within the social media platforms surrounding the event.

Another online status measurement that is taken into account in some instances is a poster's general status and following online, which may include such things as the posters number of followers, friends, connections, and contributions to online social communities. When a poster satisfies a set milestone of online status (e.g., 10,000 followers/friends or more), the platform user(s)/moderator(s) is notified in order to reach out to this poster and thank them for the mentions and perhaps even further recognize or reward them. Due to the significant online status of the poster, a large base and following for an event online can be established more quickly. When the platform requests info from the posting server of the poster's status an additional request is made for the poster's following count, friend count, and/or other status measurement appropriate for the particular social media application. This information is also written to the database or otherwise stored in memory accessible to the platform. In some instances, the poster's status is also verified and authorized from online influence measurers, such as Klout.com. At any time an authorized user can view all top ranked influencers who are participating and engaged at an event. In some implementations, the relative influence is indicated visually to the authorized user. For example, in some instances different shades and boldness of grey designate their magnitude of influence, and if they are super influencers their usernames will be changed to a different color. However, any type of visual indicator(s) may be used to signify relative influence of a poster. When setting up the stream an authorized user can set the following and influence milestones for the event. If the milestones are reached the platform notifies the platform user(s)/moderator(s) of the poster's following so further action and recognition can occur with that poster with influence.

Figure 20:
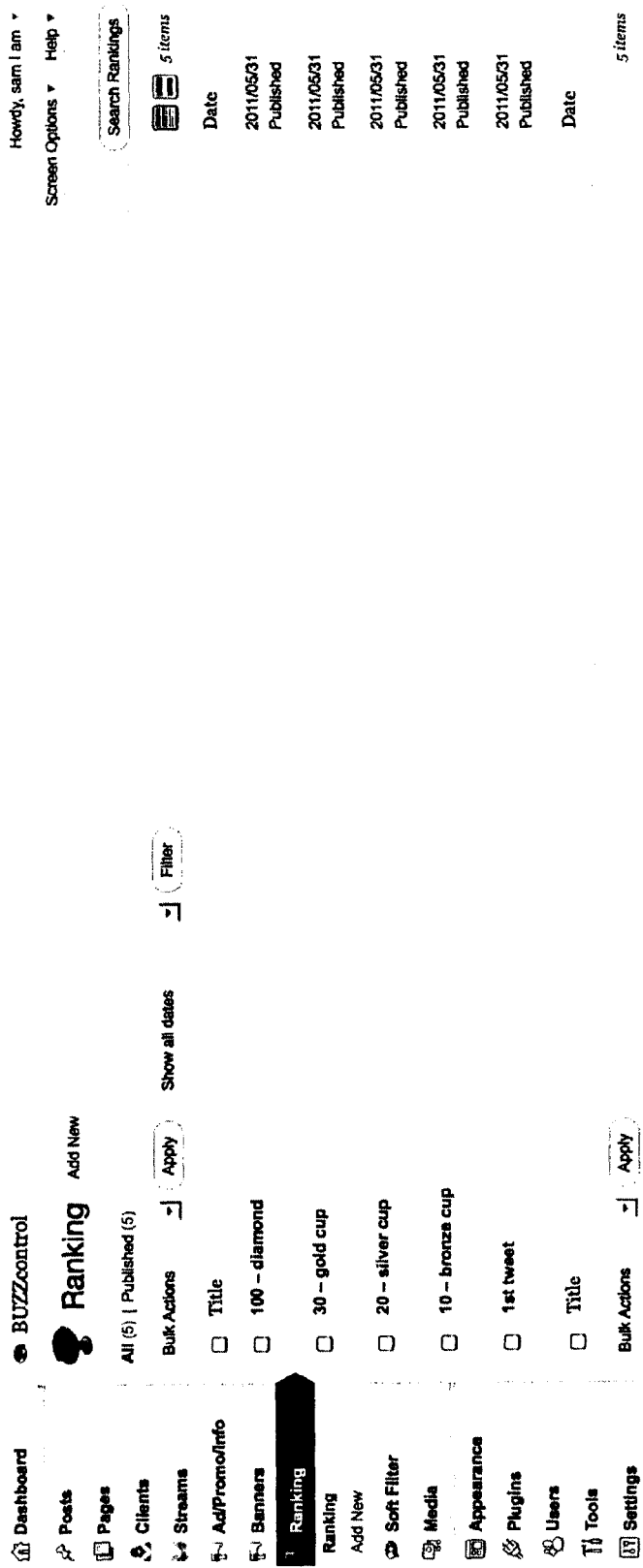
FIG. 20 is a screen shot illustrating control options related to a ranking system according to an exemplary embodiment of the present disclosure.
Figure 21:
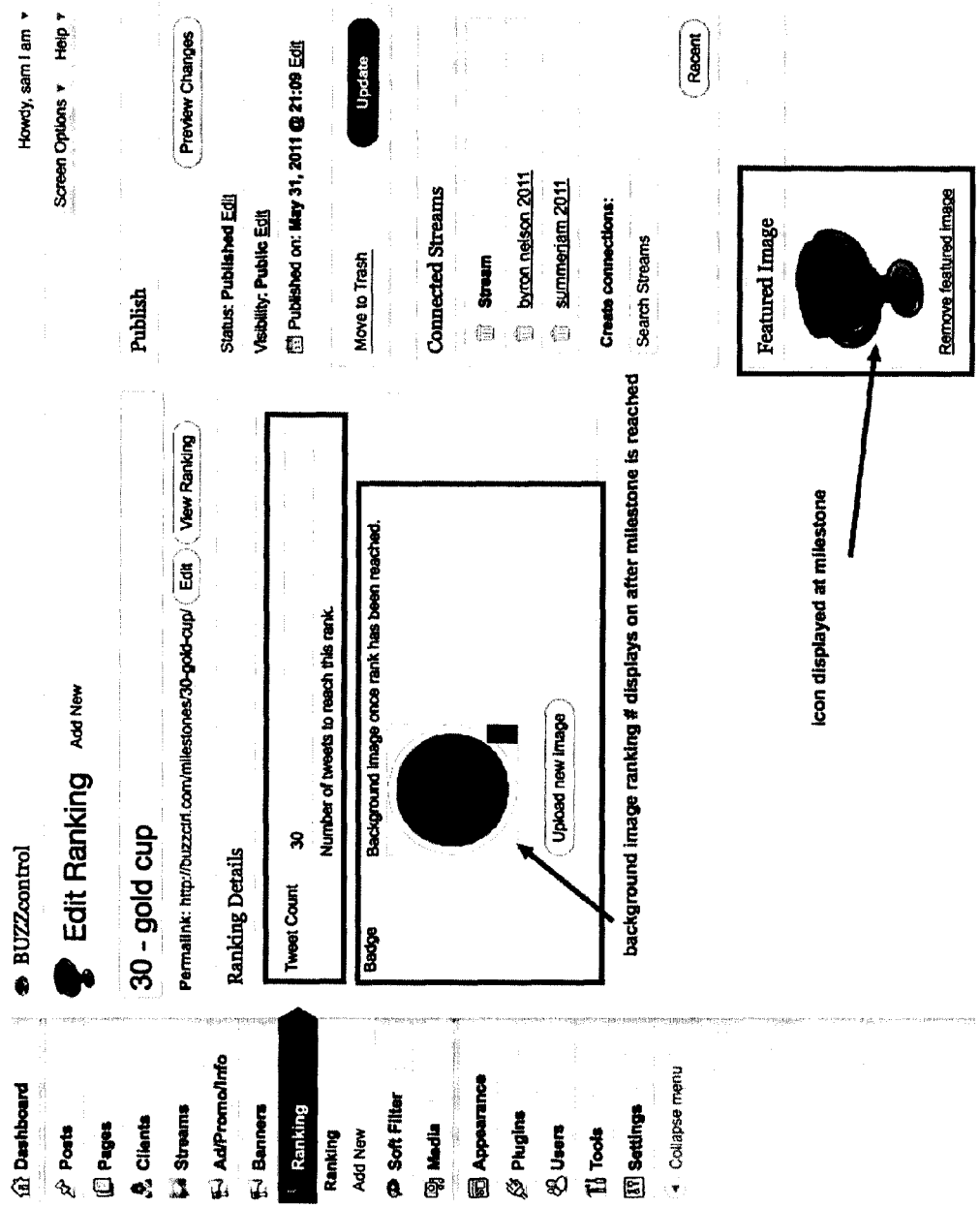
FIG. 21 is a screen shot illustrating control options related to a ranking system according to another embodiment of the present disclosure.

Referring to FIGS. 20 and 21, in the platform stream control the user activates the ranking feature and accesses the RANKING tab of the user interface. As shown, the user is able to set milestones for number of posts and reposts. With each milestone default icons can be used or if desired, custom icons and "level" branding can be uploaded and activated. The user can use the default badges and branding or upload custom badges for each milestone. In that regard, the icons are selected to coordinate with an event's topic in some instances. FIG. 21 illustrates an exemplary user interface associated with creating custom badges or icons. Also within the platform's RANKING setup is the option to activate a RECOGNITION feature. If activated, the authorized user is then asked to set the milestone for notification that the poster has a significant following online. With the milestone set, the platform can now send the user created or default auto-thanks direct/private post to any poster meeting the milestone. At any point the user(s)/moderator(s) can check the on the highest ranked posters of any time period. The user(s)/moderator(s) can also quickly see who the posters are with the most online clout or following. In this manner, the platform's RANK & RECOGNITION features spur constant and continued participation among posters. Activating one or both of these platform features adds a competitive edge to the event and greatly increases the mentions and engagement in the social media communities for the event.

Broadcast, Reposting, Syndication, & Visualization

The platform's stream(s) of captured, moderated, curated, and/or ranked posts associated with an event are enhanced stream(s) of content that can be shared to reinforce the event while it is happening on site as well as simultaneously share the experiences of the event with the online audience.

On site, platform servers are connected to large screen projectors, televisions, monitors, other displays, distributions, and/or broadcast systems. In some instances, the platform is configured to broadcast the enhanced content in one or more formats. For example, a full screen format can provide information such as the poster's profile image, username, platform ranking, post, time posted, and/or other information related to the poster and/or post. This information can be broadcast on top of live video, photos either professionally captured or stripped from actual postings, a graphic, or an enlarged profile image. The authorized user can also decide on numerous styles of visualization. For example, visualization styles can include multi-media slide show presentation, to animated Flash animation of the moderated content, to full screen multi-post builds. Generally, each type of visualization is intended to add a unique engaging, entertaining, reinforcement to the event. Another broadcast format that is utilized by the platform in some instances is a ticker format. In the ticker format, the platform broadcasts an enhanced content stream across the bottom of the screen much like a news ticker. This is a great option when other event content has priority on a particular display and/or the format of the display does not allow for use of the full screen format (e.g., display running around a stadium between upper and lower sections). In some instances, the particular display format for the stream is selected based on the type of display it is being broadcast on and/or what is going on at the event. For example, for events where a display is utilized to show some aspect of the event (e.g., live video, presentations, etc.), the broadcast may be in ticker format while the event is occurring and the display is being utilized. However, during breaks and/or stoppages at the event and/or other times when the display is not being utilized the broadcast can be in full screen format.

The platform also reposts the enhanced content to the online followers via the event/entity's social network accounts. Online followers are now sharing and are included in the communication and engagement happening on site. The stream(s) that are broadcast to the online audience can be curated to the online audience(s) (i.e., filtered to specific interests of unique and separate audience(s)) and, in some instances, provide the ability to click through any of the links that are present and intended for the online audience. In some embodiments, the enhanced streams that are to be broadcast in the full screen and/or ticker formats at the event have all the hyperlinks and/or URLs removed from the posts as such links have little to no functionality when shared in presentation mode in large format. Finally, the platform can syndicate the enhanced content back out to websites/blogs/social network sites as a feed. Depending on the entity playing back the feed different pieces of information are shared in the stream for that feed. In that regard, the platform also provides private API's, RSS feeds, and/or access to hidden user accounts to approved event producers to receive the platform enhanced stream securely and succinctly.

The platform tags all content associated with a stream. If the content is approved it sits in a queue/database ready to be pulled when requested. Both of the platform's full screen and ticker broadcast players pull the enhanced stream content and broadcast it through displays that are in communication with the platform. In the platform's broadcast control area the user can select the artistic presentation of the content as well as control the size and speed of the streams. All of the enhanced approved content is viewable in queue. The user(s)/ moderator(s) can adjust the queue by changing order, or do a secondary adding or deleting of posts. It's also in this section where the user can set the time length of the queue. For example, play all moderated and curated posts from the last 4 hours, the last 5 days, or otherwise. The platform also has a robust set of broadcast rules and controls to ensure freshness and appropriate play time for each post. Every post is tracked during broadcast to make sure it isn't played again and again resulting in viewer/follower fatigue. However, more important or engaging posts are played more often than other posts in some instances.

Figure 22:
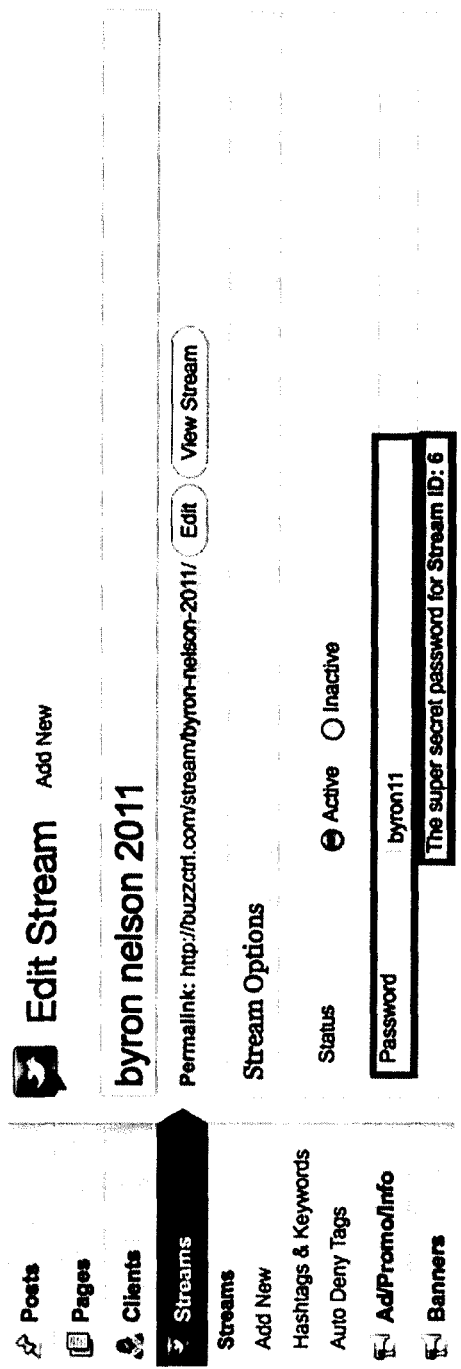
FIG. 22 is a screen shot illustrating control options related to a stream according to another embodiment of the present disclosure.
Figure 23:
FIG. 23 is a screen shot illustrating a login screen according to another embodiment of the present disclosure.
Figure 24:
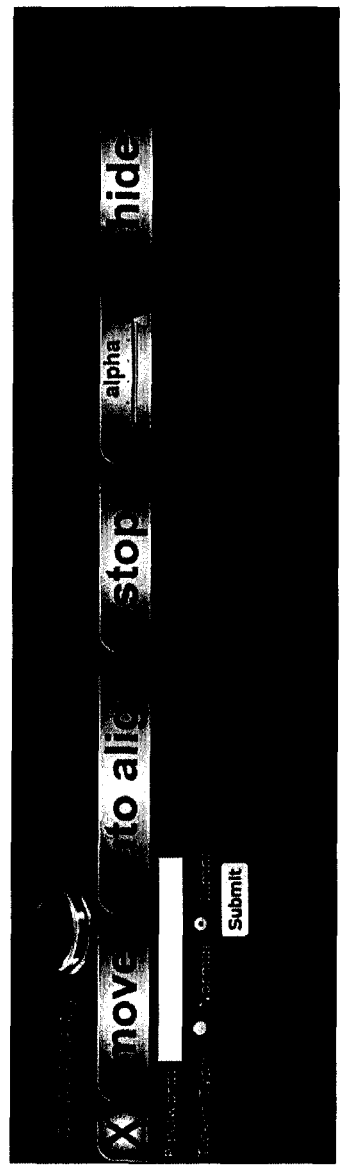
FIG. 24 is a screen shot illustrating control options related to a stream according to another embodiment of the present disclosure.

As shown in FIG. 22, in the initial platform STREAM setup the user sets the password and is also given a stream ID which will be requested by the platform's full screen broadcaster and stream ticker players when they are initiated. In some instances, each of the full-screen broadcaster player and the ticker broadcaster player is a stand alone player that can be run on any web/network enabled computing devices that feed the displays found around the event. In some instances, the players are self-rehabilitating, meaning they constantly monitor connectivity strength and keep 30 fresh posts in cue/memory locally to deter any downtime or loss of visualization should connectivity be lost. Note that the computing devices are remote from the displays in many instances and communicate video and/or audio signals to the display via wired and/or wireless connections. As shown in FIG. 23, when started the broadcast players request either a stream ID and/or password in order to pull the correct stream for broadcasting. Also, the broadcast ticker size adjustment can be made for either use with screens and displays or the much larger projections. FIG. 24 illustrates a manner of adjusting the size of the ticker display (adjusting the top margin) between "Normal" and "Jumbo" according to one embodiment of the present disclosure. Further, during the initial stream setup the platform will ask if there is a network account that needs to be activated for reposting. If so the user enters those particulars and automatically the platform reposts the enhanced stream via these accounts. FIG. 25 illustrates such a repost setup according to an embodiment of the present disclosure. Likewise there is the option to syndicate via private, hidden accounts and RSS feeds so that the event web teams can pull the platform's enhanced streams of content into any web properties they desire, such as websites, blogs, newsfeeds, social networks, or other format.

The full screen broadcast can be visualized in various ways. In that regard, the platform user(s)/moderator(s) can decide whether they would like a video background that is supplied from the local production team, which can be a live camera feed or any prerecorded video. The background can also be professionally captured and loaded photographs either loaded locally or pulled from the web. The background can be advertising imagery for a sponsor. The background can also be a simple event logo(s). The background can also be the synchronized or non-synchronized moderated images participants are posting to any of the various networks or directly within their posts. And finally, the background can be a full screen presentation of the participants profile image which is gleaned from the networks where the posts are being pulled from originally.

Figure 26:
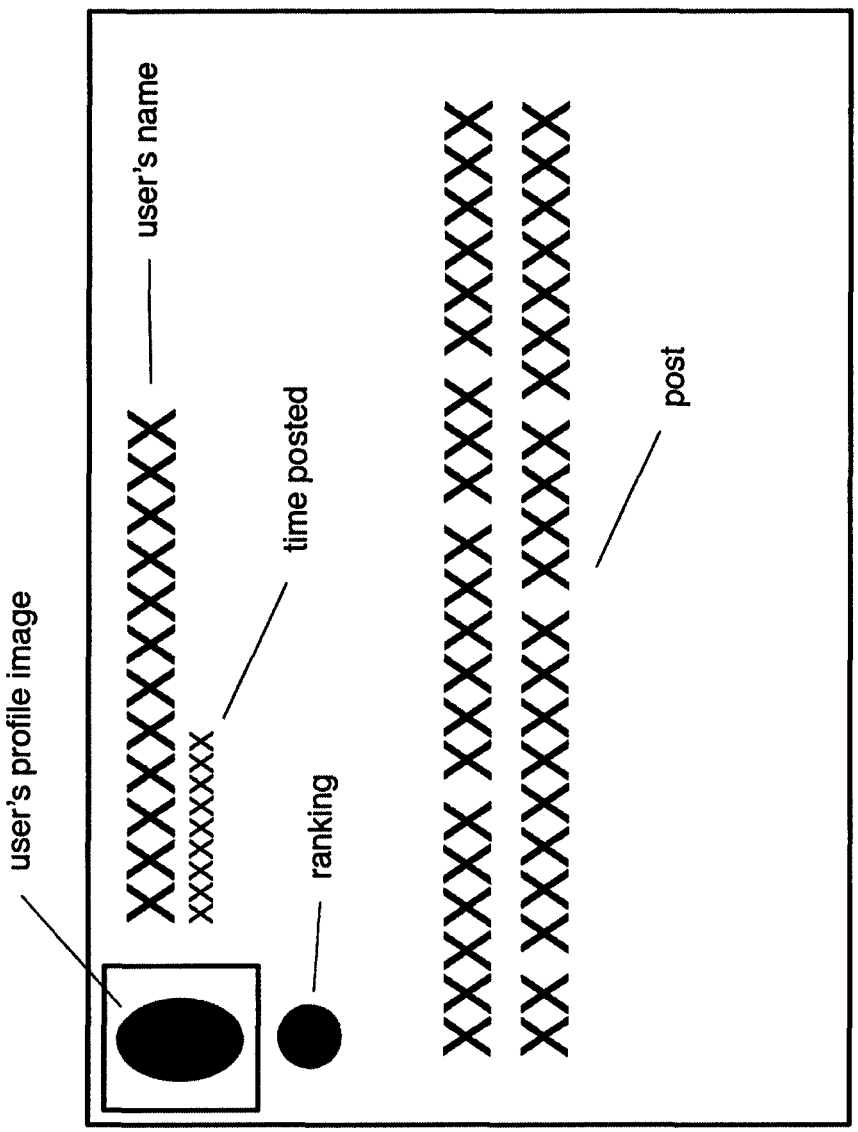
FIG. 26 is a diagrammatic illustration of a display screen displaying a stream according to an exemplary embodiment of the present disclosure.
Figure 27:
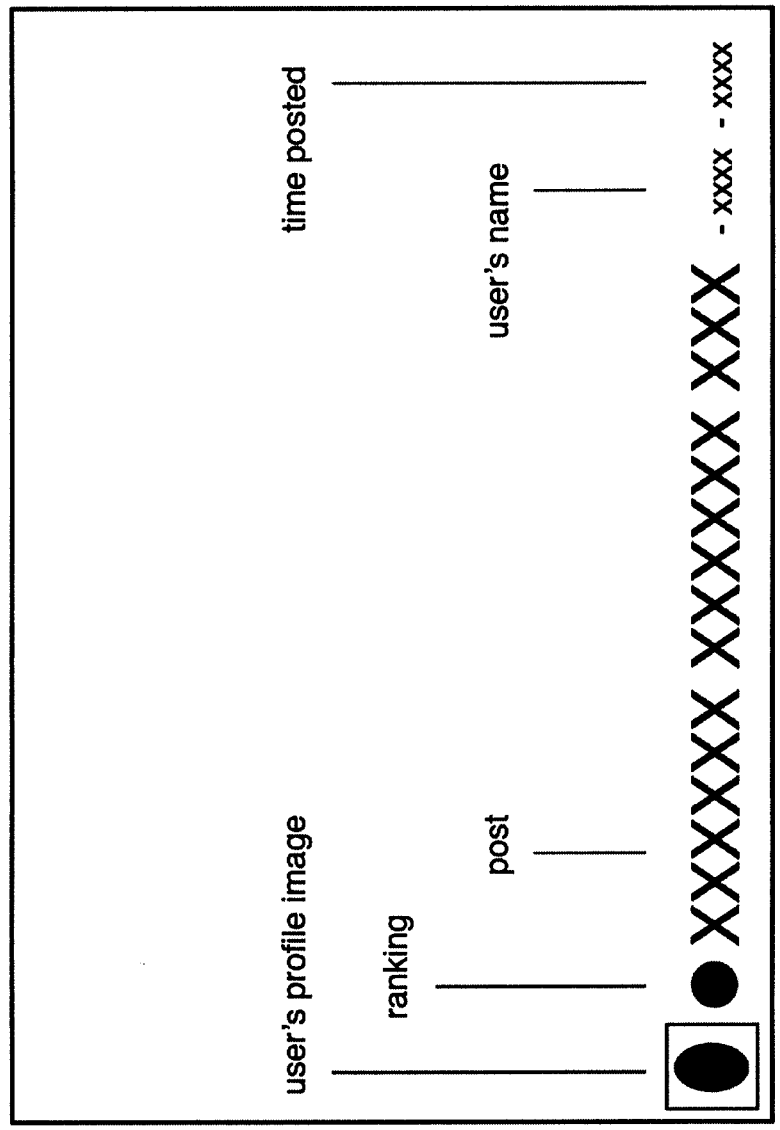
FIG. 27 is a diagrammatic illustration of a display screen displaying a stream according to another embodiment of the present disclosure.

With the background choice selected, the full screen broadcast player will then present the selected background along with the stream. In some instances, the stream includes the poster's profile avatar, username, post, ranking, and time posted. However, any combination of posts, poster information, and/or event information may be utilized as the stream. In that regard, the particular visualization format utilized can have many layouts. FIG. 26 illustrates an exemplary full-screen layout according to an embodiment of the present disclosure. In some instances, the layouts are designed by graphic artists or others and then uploaded for use by the platform in generating the streams. In that regard, in some instances platform style sheets are uploaded to the platform. The broadcast ticker allows for the event/entity to present whatever media they'd like to full screen while the broadcast ticker scrolls across the bottom, top, and/or side of the display (either over a portion of media or directly next to the media (such that the none of the media is blocked by the ticker)). The ticker stream also includes the poster's profile avatar, username, post, ranking, and time posted in some instances. Again, however, any combination of posts, poster information, and/or event information may be utilized as the ticker stream. FIGS. 27 and 28 illustrate exemplary partial-screen layout according to embodiments of the present disclosure. It is understood that various types of displays, backgrounds, and stream layouts will be used in the context of the same event in some instances. The platform shares the enhanced stream with the participants on site with its broadcasting applications, while the platform's reposting and syndication shares the content with the online participants, infinitely increasing the reach of the event.

Metrics

The platform is constantly obtaining data that can be utilized to measure vital statistics of the event as it is happening and/or after the event has concluded. This is an important feature of the platform in some instances because most mentions and posts via social networks have a short lifespan of a couple days or a week before their ability to be retrieved expires. Because of this, in some implementations the platform of the present disclosure archives all posts about the event as it captures them so that the posts can be utilized for metrics weeks, months, if not years after an event comes to a close. In real time, this is information that assists event/entities in constantly adjusting their social media plans for maximum results. At any point during an event a dashboard can be viewed to see platform metrics that include various measurements related to the event, including but not limited to: amount of mentions, number of participants, number of posts per contributor (passion), amount of posts filtered out of the conversation, number of reposts, reach, key influencers, global positioning of postings, trends, buzzwords, sentiment, gender, and/or other indications of the event social media profile. Of course a couple days after the close of an event full platform metrics can be provided to measure the success of an event in its entirety or during specific requested times.

Figure 29:
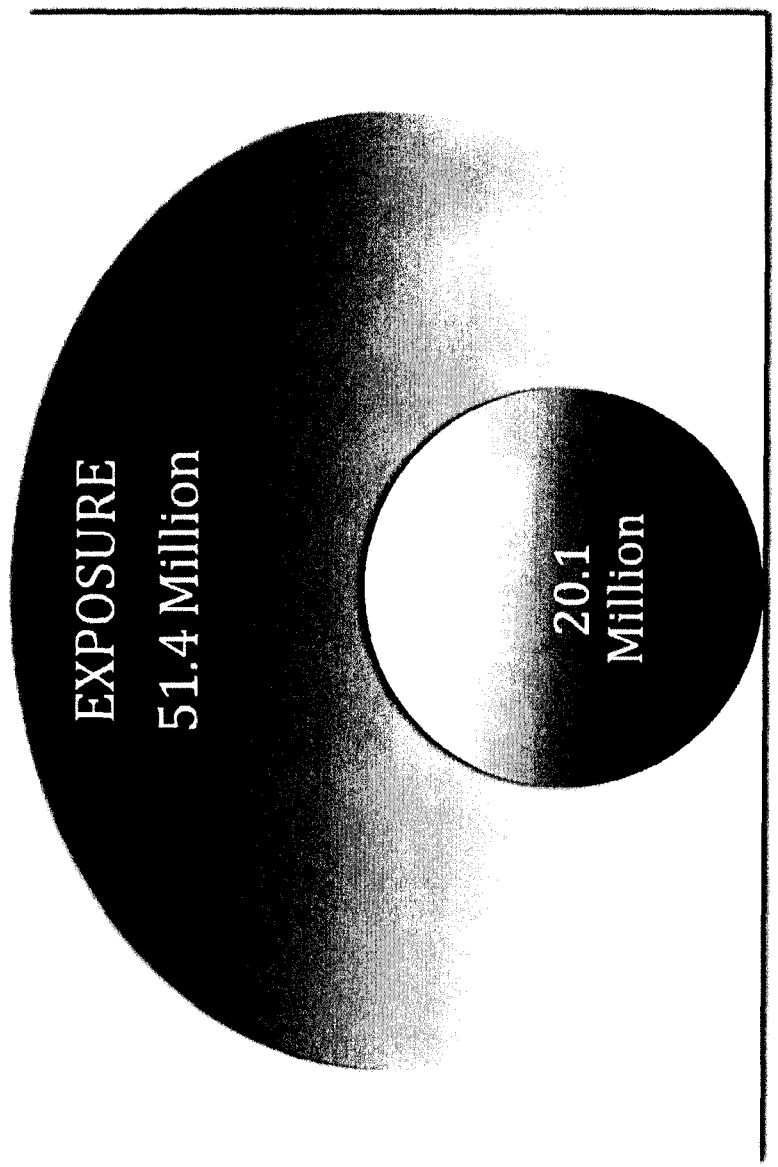
FIG. 29 is a graphical representation of an analysis of data related to social media management in conjunction with an event according to an exemplary embodiment of the present disclosure.
Figure 30:
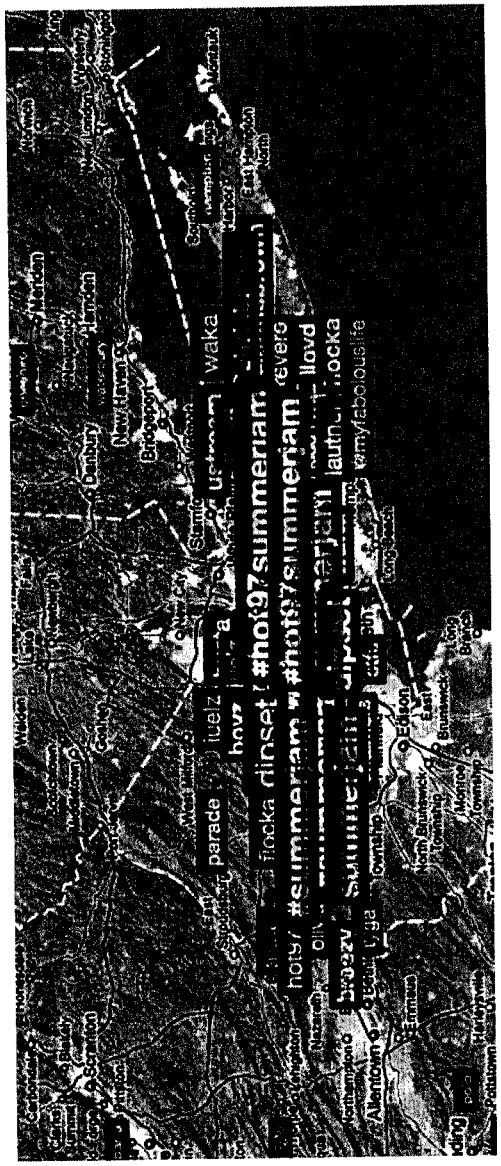
FIG. 30 is a graphical representation of an analysis of data related to social media management in conjunction with an event according to another embodiment of the present disclosure.
Figure 31:
FIG. 31 is a graphical representation of an analysis of data related to social media management in conjunction with an event according to another embodiment of the present disclosure.

In that regard, another tab inside the user interface of the platform is METRICS. Inside this section, authorized platform user(s) can either view the default real time data results or request custom searches/measurements of the activity taking place. The data shared is not only measurement on the platform's database but can also be pulled from the integrated measurement services, such as www.trendsmap.com, tweetfeel.com, or otherwise. Inside the platform's metrics section the user has numerous choices as to how they would like to receive real time feedback as the event is happening. The user designates the measurements that are desired and sets the parameters related to those measurements. Measurements can include, without limitation, such things as: time or timeframe of measurement (e.g., from initiation until present or from 2-4 pm); number of posters (reach); number of posts; number of impressions; location of posts (e.g., within 5 mile range of event, outside 5 miles, countries participating, or other geographical breakdowns); sentiment (positive/negative); trending; buzzwords (keyword cloud); MVP (most valuable posters; posters that have an online following of a predetermined threshold or more); Activity and passion of audience (percentage of single posters to posters posting multiple times); Virility (percentage of reposts to 1-shot posts); Loyalty (percentage of posters that are reposting); and/or other measurements related to the social media impact of the event. All of this event critical information is a true barometer of the effectiveness of the Social Media engagement for the event. In some instances, the metrics reports that are run are saved along with all of the other stream stats and can be instantly exported, emailed, printed, or otherwise shared. FIGS. 29-32 illustrate various exemplary embodiments showing how the metrics can be visualized. In that regard, FIG. 29 provides a graphical representation of the exposure and reach of an event. FIG. 30 provides a local or regional map-based graphical representation of the exposure and reach of event based on posts retrieved for an event. FIG. 31 provides a global map-based graphical representation of the exposure and reach of event based on posts retrieved for an event. Finally, FIG. 32 provides a word-collage representing the most common subject matters, topics, and/or words utilized in the posts related to an event.

Analytics and Intelligence

Thousands and thousands of posts and mentions are made about an event as it happens. All of these posts are stored to platform servers or other memory accessible by the platform. These unsolicited conversations and unprovoked observations are gold mines of authentic information for planners, organizers, hosts, sponsors, advertisers, and others. The platform uses unstructured text search of this super rich database to pull together significant, extremely relevant, information. Instead of doing random polling or surveying, a request can be created for a particular topic, for example "parking". All posts containing anything to do with parking are returned and then analyzed for such things as sentiment (positive/negative), most used keywords, and any other identifiers or information the requester desires. This approach returns TRUE unsolicited, unrequested, unprovoked, unpressured, untainted, matter of fact, authentic data about an event. It's the same categories of information retrieved for decades via traditional polling, surveys, and interviews; however, done passively with zero prejudice, pressure, or presumption.

To obtain such analysis, an authorized platform user selects the Metrics tab of the user interface. From this section the user places a request for any key indicators or keywords requested about the event. The platform then queries the database of stored posts via an unstructured data search and returns all posts containing the keyword or text requested. This new subset of data can now be analyzed for sentiment, reoccurring words or indicators, significance or total mentions, contributors, and/or other measurement(s) the event would like to analyze. The resulting analysis can give true real time indication to the effectiveness of any portion of an event. For example, which presenter resonated with the audience? Or, what was the reaction to the venue? Or, how was parking, food, lines, weather, etc.? After the initial request is complete, a further filtering and analysis can be requested on the data to fine tune exact metrics specifically for the requestor's needs. For example, each negative sentiment, post, poster can be reviewed and decided on the spot if the sentiment designation is true. Likewise, all negative results can be requested in an active actionable "live" report allowing users as well as their clients to understand specifically where there are issues or problems with an event and at the same time reach out and amend those issues with individual posters when possible. As all of the event critical information is aggregated passively, meaning attained without direct interaction or solicitation from guests, this valuable data is infinitely more accurate than the polling, surveying, and interviewing of decades past.

Persons skilled in the art will also recognize that the apparatus, systems, and methods described above can be modified in various ways. Accordingly, persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A method, comprising:
    aggregating, using a computing device, posts made to at least one social media platform by a plurality of posters to identify a plurality of posts related to an event, wherein the aggregating step is performed by at least one computing device sequentially querying a database of the at least one social media platform over time;
    wherein the event has a local audience comprised of a plurality of people in attendance at an event site;
    wherein the event has a remote audience comprised of a plurality of people remote from the event site;
    filtering the identified plurality of posts related to the event to identify a plurality of relevant posts;
    broadcasting at least one of the plurality of relevant posts for display on at least one local display at the event site; and
    broadcasting at least one of the plurality of relevant posts for display on at least one remote display remote from the event site;
    wherein broadcasting at least one of the plurality of relevant posts to a local display further includes broadcasting at least one event-based insert.

2. The method of claim 1, wherein the aggregating step is performed by a plurality of synchronized computing devices.

3. The method of claim 1, wherein aggregating the posts made to the at least one social media platform includes searching for at least one keyword within the posts.

4. The method of claim 3, wherein the at least one keyword includes an identifier associated with the event.

5. The method of claim 1, further comprising obtaining information about each of the plurality of posters associated with the plurality of relevant posts from the at least one social media platform, and wherein information about the poster associated with the post is displayed along with the post for each of the plurality of relevant posts.

6. The method of claim 1, wherein the local display is a full-screen format.

7. The method of claim 1, wherein the local display is a ticker format.

8. The method of claim 1, wherein broadcasting at least one of the plurality of posts to the remote display comprises generating a web feed.

9. The method of claim 1, further comprising moderating the relevant posts.

10. The method of claim 9, wherein moderating the relevant posts includes approving the post or denying the post, and wherein only the approved, relevant posts are broadcast for display on the at least one local display, the at least one remote display, or both the at least one local display and the at least one remote display.

11. The method of claim 10, wherein moderating the posts is performed by at least one user through a user interface displaying at least one of the relevant posts.

12. The method of claim 11, wherein moderating the posts is performed by a plurality of users, and wherein the plurality of relevant posts are divided between the plurality of users to prevent duplicate moderation of a relevant post.

13. The method of claim 1, wherein the event is selected from the group of events consisting of a conference, a meeting, a concert, a sporting event, a play, a musical, a movie, and a television show.

14. The method of claim 1, further comprising:
    curating the relevant posts to identify a first group of posts for a first target audience and a second group of posts for a second target audience different than the first target audience, and
    wherein the steps of broadcasting the plurality of relevant posts for display on at least one local display and at least one remote display comprise broadcasting the first group of posts to the first target audience and broadcasting the second group of posts to the second target audience.

15. A method, comprising:
aggregating, using a computing device, posts made to at least one social media platform by a plurality of posters to identify a plurality of posts related to an event, wherein the aggregating step is performed by at least one computing device sequentially querying a database of the at least one social media platform over time;
filtering the identified plurality of posts related to the event to identify a plurality of relevant posts;
broadcasting the plurality of relevant posts for display on at least one display; and
curating the relevant posts to identify a first group of posts for a first target audience and a second group of posts for a second target audience different than the first target audience, and
wherein the steps of broadcasting the plurality of relevant posts for display on at least one local display and at least one remote display comprise broadcasting the first group of posts to the first target audience and broadcasting the second group of posts to the second target audience;
wherein the first target audience is an audience at the event and the second target audience is an audience remote from the event;
wherein broadcasting at least one of the plurality of relevant posts to a local display further includes broadcasting at least one event-based insert.

16. The method of claim 1, wherein the at least one event-based insert is an advertisement.

17. The method of claim 1, further comprising evaluating the plurality of posts related to the event to calculate at least one of: a number of mentions, a number of participants, a number of reposts, reach, and exposure.

18. The method of claim 17, wherein evaluating the plurality of posts is performed live during the event.

19. The method of claim 17, wherein evaluating the plurality of posts is performed after conclusion of the event.

20. The method of claim 17, wherein evaluating the plurality of posts comprises evaluating a plurality of posts for a defined time period relative to the event.

* * * * *